US012762246B2

(12) United States Patent
Wu

(10) Patent No.: US 12,762,246 B2
(45) **Date of Patent: *Oct. 13, 2026**

(54) FACILITATING ANALYSIS OF SOFTWARE VULNERABILITIES

(71) Applicant: Rubrik, Inc., Palo Alto, CA (US)

(72) Inventor: Di Wu, Newark, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,122

(22) Filed: Jan. 25, 2023

(65) Prior Publication Data

US 2023/0169183 A1 Jun. 1, 2023

Related U.S. Application Data

(63) Continuation of application No. 16/668,910, filed on Oct. 30, 2019, now Pat. No. 11,599,643.

(51) Int. Cl.
*G06F 21/57* (2013.01)
*G06F 9/455* (2018.01)
(Continued)

(52) U.S. Cl.
CPC ........ *G06F 21/577* (2013.01); *G06F 9/45558* (2013.01); *G06F 11/1471* (2013.01);
(Continued)

(58) Field of Classification Search
CPC ............... G06F 21/577; G06F 9/45558; G06F 11/1471; G06F 11/1451; G06F 16/128;
(Continued)

(56) References Cited

U.S. PATENT DOCUMENTS 7,181,646 B2 * 2/2007 Kano .................. G06F 11/1469 714/21
7,356,679 B1 4/2008 Le et al.
(Continued)

OTHER PUBLICATIONS

Shu et al., "A Study of Security Vulnerabilities on Docker Hub", CODASPY '17; Proceedings of the Seventh ACM on Conference on Data and Application Security and Privacy, pp. 269-280, Mar. 2017.

(Continued)

*Primary Examiner* — Pramila Parthasarathy
(74) *Attorney, Agent, or Firm* — Holland & Hart LLP

(57) ABSTRACT

Systems and methods for facilitating an analysis of software vulnerabilities are described. The system receives a first request to present software vulnerabilities of a virtual machine on a production machine. The first request includes a first selection including a virtual machine identifier identifying the virtual machine on the production machine. The software vulnerabilities include a first software vulnerability. The system presents a first electronic user interface including software vulnerabilities for the virtual machine. The system receives a second request including a second selection identifying a first software vulnerability. The system presents a second electronic user interface including presenting recovery point identifiers corresponding to snapshot images stored on a database. The snapshot images being of the production machine and including the virtual machine and the first software vulnerability.

17 Claims, 22 Drawing Sheets

(51) Int. Cl.
*G06F 11/1471* (2026.01)
*G06F 16/11* (2019.01)

(52) U.S. Cl.
CPC .. *G06F 16/128* (2019.01); *G06F 2009/45587* (2013.01); *G06F 2009/45591* (2013.01)

(58) Field of Classification Search
CPC . G06F 2009/45587; G06F 2009/45591; G06F 2201/815; G06F 8/65; G06F 2201/84
See application file for complete search history.

(56) References Cited

U.S. PATENT DOCUMENTS

| | | | | |
|---|---|---|---|---|
| 7,565,382 | B1 * | 7/2009 | Sobel | G06F 21/74 |
| 7,784,098 | B1 * | 8/2010 | Fan | G06F 11/1469 726/25 |
| 7,890,869 | B1 * | 2/2011 | Mayer | G06F 21/577 709/224 |
| 7,921,335 | B2 | 4/2011 | Kiefer et al. | |
| 9,032,373 | B1 | 5/2015 | Gupta et al. | |
| 9,069,482 | B1 | 6/2015 | Chopra et al. | |
| 9,471,441 | B1 | 10/2016 | Lyadvinsky et al. | |
| 9,507,946 | B2 * | 11/2016 | Bang | G06F 21/52 |
| 9,516,053 | B1 | 12/2016 | Muddu et al. | |
| 9,524,389 | B1 * | 12/2016 | Roth | G06F 9/45558 |
| 9,645,847 | B1 | 5/2017 | Roth | |
| 9,652,326 | B1 | 5/2017 | Bauer et al. | |
| 9,900,339 | B2 * | 2/2018 | Bach | H04L 67/55 |
| 10,200,411 | B1 * | 2/2019 | Pigoski, II | G06F 9/45533 |
| 10,552,610 | B1 | 2/2020 | Vashisht et al. | |
| 10,579,803 | B1 * | 3/2020 | Mueller | G06F 21/577 |
| 10,581,897 | B1 | 3/2020 | Natanzon et al. | |
| 10,592,405 | B2 * | 3/2020 | Duer | G06F 11/3692 |
| 10,678,448 | B2 | 6/2020 | Jain et al. | |
| 11,070,582 | B1 | 7/2021 | Berger et al. | |
| 11,159,402 | B1 | 10/2021 | Subramanian | |
| 11,216,563 | B1 | 1/2022 | Veselov et al. | |
| 11,366,682 | B1 * | 6/2022 | Krasilnikov | G06F 9/45558 |
| 11,593,491 | B2 * | 2/2023 | Wu | G06F 16/27 |
| 11,599,643 | B2 * | 3/2023 | Wu | G06F 11/1471 |
| 11,621,975 | B2 * | 4/2023 | Ocepek | H04L 63/20 726/25 |
| 11,663,031 | B2 * | 5/2023 | Shua | G06F 11/3476 726/25 |
| 11,663,340 | B2 * | 5/2023 | Wu | G06F 11/1451 726/25 |
| 11,822,672 | B1 * | 11/2023 | Kravtsov | G06F 21/577 |
| 2004/0019803 | A1 * | 1/2004 | Jahn | H04L 63/1433 709/224 |
| 2004/0205748 | A1 | 10/2004 | Iyer | |
| 2005/0005169 | A1 * | 1/2005 | Kelekar | G06F 9/542 726/4 |
| 2006/0070128 | A1 * | 3/2006 | Heimerdinger | H04L 63/1441 726/23 |
| 2007/0033586 | A1 | 2/2007 | Hirsave et al. | |
| 2009/0106424 | A1 | 4/2009 | Safari et al. | |
| 2009/0125692 | A1 * | 5/2009 | Yamamoto | G06F 11/1458 711/E12.103 |
| 2010/0175068 | A1 | 7/2010 | Fifer et al. | |
| 2011/0055714 | A1 | 3/2011 | Vemulapalli et al. | |
| 2011/0197051 | A1 | 8/2011 | Mullin et al. | |
| 2011/0197097 | A1 | 8/2011 | Beaty et al. | |
| 2012/0072968 | A1 * | 3/2012 | Wysopal | G06F 21/577 726/1 |
| 2012/0131677 | A1 | 5/2012 | Chakra et al. | |
| 2013/0074188 | A1 | 3/2013 | Giakouminakis et al. | |
| 2013/0086585 | A1 | 4/2013 | Huang et al. | |
| 2013/0117232 | A1 | 5/2013 | Lee et al. | |
| 2014/0115285 | A1 | 4/2014 | Arcese et al. | |
| 2014/0146055 | A1 | 5/2014 | Bala et al. | |
| 2014/0149492 | A1 | 5/2014 | Ananthanarayanan et al. | |
| 2014/0149983 | A1 | 5/2014 | Bonilla et al. | |
| 2014/0380473 | A1 * | 12/2014 | Bu | G06F 21/566 726/23 |
| 2015/0161151 | A1 * | 6/2015 | Koryakina | G06F 11/1451 711/114 |
| 2015/0186645 | A1 * | 7/2015 | Aziz | G06F 9/45558 726/23 |
| 2015/0212896 | A1 | 7/2015 | Pawar et al. | |
| 2015/0244729 | A1 | 8/2015 | Mao | |
| 2016/0117163 | A1 | 4/2016 | Fukui et al. | |
| 2016/0188882 | A1 * | 6/2016 | Mahrous | G06Q 50/00 726/25 |
| 2016/0378456 | A1 | 12/2016 | Chai et al. | |
| 2017/0063896 | A1 | 3/2017 | Muddu et al. | |
| 2017/0147819 | A1 | 5/2017 | Vasilenko et al. | |
| 2017/0192853 | A1 | 7/2017 | Alberti et al. | |
| 2017/0318048 | A1 * | 11/2017 | Htay | H04L 63/1433 |
| 2018/0113622 | A1 | 4/2018 | Sancheti | |
| 2018/0124094 | A1 * | 5/2018 | Hamdi | G06F 7/24 |
| 2018/0181761 | A1 | 6/2018 | Sinha et al. | |
| 2018/0225177 | A1 | 8/2018 | Bhagi et al. | |
| 2018/0336055 | A1 | 11/2018 | Bernardini et al. | |
| 2019/0108243 | A1 | 4/2019 | Earl et al. | |
| 2019/0188114 | A1 | 6/2019 | Hopper et al. | |
| 2019/0370471 | A1 * | 12/2019 | Petratos | G06F 8/656 |
| 2019/0384914 | A1 | 12/2019 | Awate et al. | |
| 2020/0012796 | A1 | 1/2020 | Trepagnier et al. | |
| 2020/0341864 | A1 | 10/2020 | Agrawal et al. | |
| 2020/0349030 | A1 | 11/2020 | Meadowcroft et al. | |
| 2020/0379853 | A1 | 12/2020 | Beloussov et al. | |
| 2021/0026671 | A1 * | 1/2021 | Hadas | G06F 9/45558 |
| 2021/0064758 | A1 * | 3/2021 | Zettel, II | G06F 21/577 |
| 2021/0117549 | A1 * | 4/2021 | Mandagere | G06F 21/577 |
| 2021/0124648 | A1 | 4/2021 | Srinivasan et al. | |
| 2021/0126949 | A1 | 4/2021 | Nadgowda et al. | |
| 2021/0133326 | A1 | 5/2021 | Wu et al. | |

OTHER PUBLICATIONS

Scandariato et al., “Predicting Vulnerable Software Components via Text Mining,” IEEE Transactions on Software Engineering, vol. 40, No. 10, Oct. 2014, 14 pages.
U.S. Appl. No. 16/668,849, filed Oct. 30, 2019, Allowed.
U.S. Appl. No. 16/668,910, filed Oct. 30, 2019, Issued, U.S. Pat. No. 11,599,643.
U.S. Appl. No. 16/668,964, filed Oct. 30, 2019, Issued, U.S. Pat. No. 11,593,491.

* cited by examiner

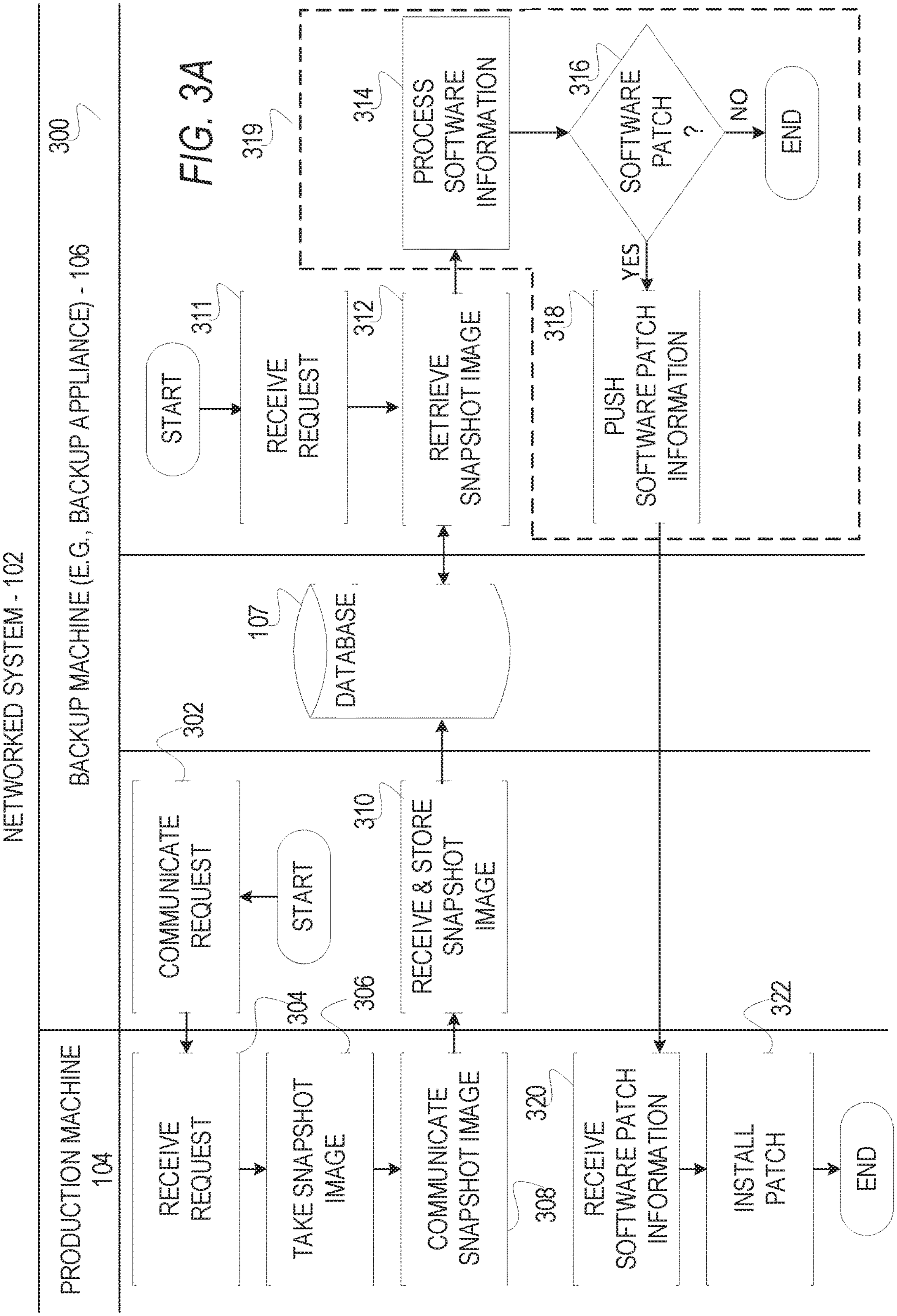
NETWORKED SYSTEM - 102
300
PRODUCTION MACHINE 104
BACKUP MACHINE (E.G., BACKUP APPLIANCE) - 106
RECEIVE REQUEST
304
TAKE SNAPSHOT IMAGE
306
COMMUNICATE SNAPSHOT IMAGE
308
RECEIVE SOFTWARE PATCH INFORMATION
320
INSTALL PATCH
322
END
COMMUNICATE REQUEST
302
START
RECEIVE & STORE SNAPSHOT IMAGE
310
DATABASE
107
START
RECEIVE REQUEST
311
RETRIEVE SNAPSHOT IMAGE
312
PUSH SOFTWARE PATCH INFORMATION
318
PROCESS SOFTWARE INFORMATION
314
SOFTWARE PATCH ?
316
YES
NO
END
319
FIG. 3A

FIG. 4B

460

461 VULNERABILITY REPORT
VIRTUAL MACHINE 1234

462

| START DATE (464) | END DATE (466) | VULNERABILITY DESCRIPTION (468) | SEVERITY INFORMATION (472) |
|---|---|---|---|
| 1/1/2018 | UNRESOLVED | CVE 1001 | LOW |
| 2/1/2018 | 3/1/2018 | CVE 1002 | HIGH |
| 3/1/2018 | UNRESOLVED | CVE 1003 | LOW |
| 5/1/2018 | 6/1/2018 | CVE 1004 | HIGH |
| 248 | 250 | 242 | 244 |

465

FACILITATING ANALYSIS OF SOFTWARE VULNERABILITIES

CROSS REFERENCE

The present application for patent is a continuation of U.S. patent application Ser. No. 16/668,910 by WU, entitled "ACILITATING ANALYSIS OF SOFTWARE VULNERABILITIES," filed Oct. 30, 2019, assigned to the assignee hereof, and expressly incorporated by reference herein.

TECHNICAL FIELD

This disclosure relates to the technical field of database maintenance and more particularly to facilitating analysis of software vulnerabilities.

BACKGROUND

Patch management systems are utilized for the detection and remediation of software vulnerabilities identified in software systems. To this end, the patch management systems typically deploy software agents to enable the implementation of a standard communications protocol. For example, patch management systems may install a common software agent in each of the nodes of each of the software systems to enable a standard communications protocol across the different software environments. Notwithstanding the advantage of a standard communications protocol, the deploying of the software agents may create an unwanted engineering complexity.

BRIEF DESCRIPTION OF THE DRAWINGS

FIG. 3A is a block diagram illustrating a method, according to an embodiment, to manage software vulnerabilities;

FIG. 4B is a block diagram illustrating an electronic user interface, according to an embodiment, for presentation of a vulnerability report for a virtual machine;

DETAILED DESCRIPTION

This description is directed at three aspects of processing software vulnerabilities in snapshot images of a production machine. The three aspects broadly include managing software vulnerabilities, facilitating analysis of software vulnerabilities and identifying a software vulnerability, as follows:

According to a first aspect, a backup machine (e.g., backup appliance) is utilized for managing software vulnerabilities by: A) retrieving snapshot images of a production machine stored in a database; B) processing the snapshot images to identify software vulnerabilities in virtual machines retrieved in the snapshot images; and C) pushing patch information to the production machine to patch the virtual machines. Identification of software vulnerabilities in snapshot images that are retrieved from a database has the advantage of enabling the identification and remediation of software vulnerabilities on the production machine without deploying or maintaining a software agent on the production machine for taking snapshot images.

According to a second aspect, the backup machine (e.g., backup appliance) facilitates an analysis of software vulnerabilities by: A) presenting a first user interface including software vulnerabilities identified in a virtual machine on a production machine; B) receiving a request including a selection identifying a particular software vulnerability; and C) presenting a second electronic user interface including recovery point identifiers corresponding to snapshot images that are selectable to mount (load into memory) the snapshot image to facilitate an analysis of the software vulnerability in the snapshot image.

According to a third aspect, the backup machine (e.g., backup appliance) identifies a new software vulnerability in snapshot images. The backup machine identifies the new software vulnerability responsive to: A) receiving a message identifying the new software vulnerability; B) identifying a relevant set of snapshot images (taken of a production machine over a period of time and stored in a database) based on the software vulnerability and other factors; C) identifying whether any of the set of snapshot images include virtual machines that include the software vulnerability; and D) registering the software vulnerability in association with the snapshot image and a virtual machine in the database responsive to identifying the snapshot image includes the virtual machine that includes the software vulnerability; and e) pushing patch information to the production machine to patch the virtual machines.

Figure 1:
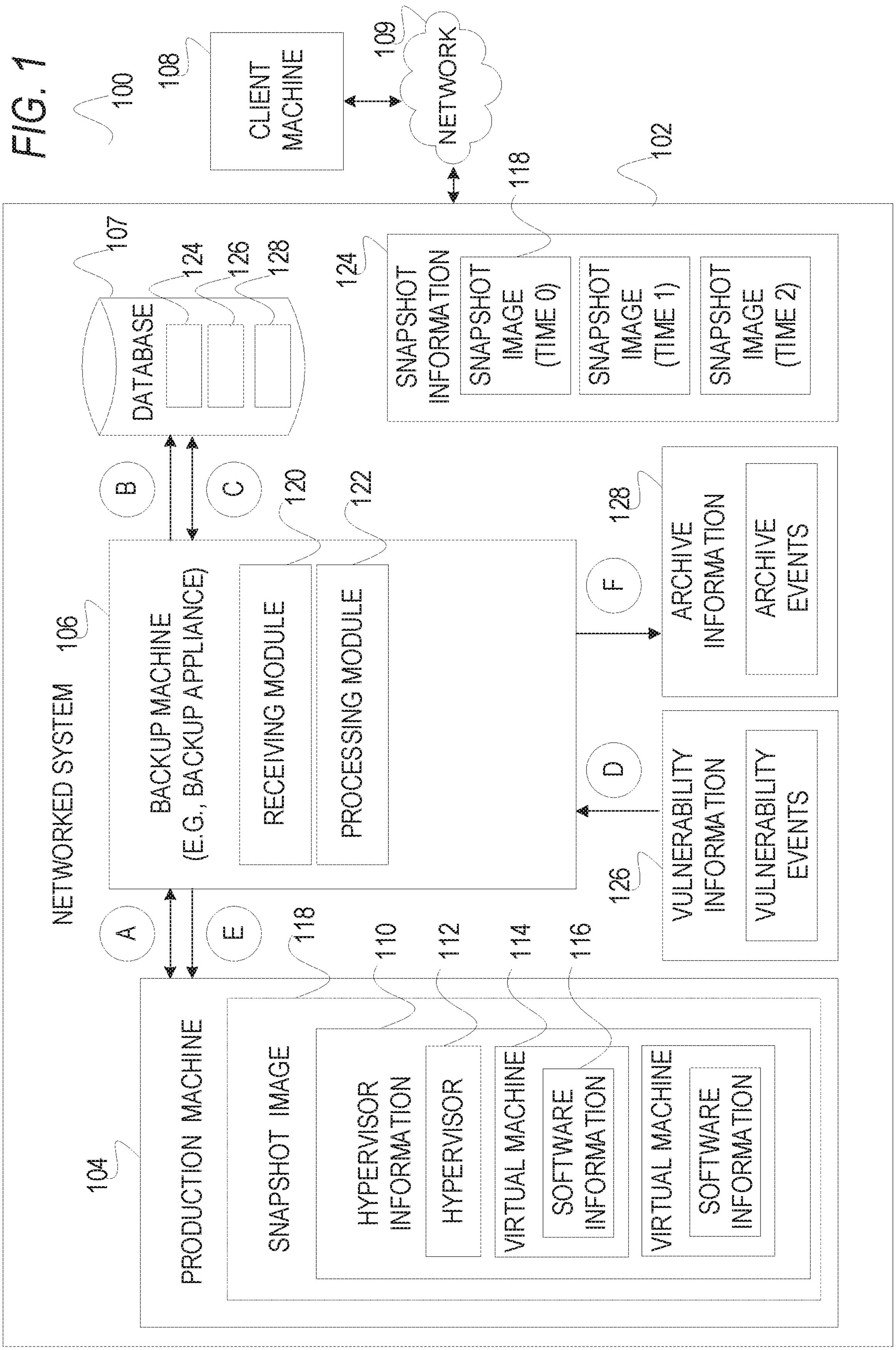
FIG. 1 is a block diagram illustrating a system, according to an embodiment, to manage software vulnerabilities.

FIG. 1 is a block diagram illustrating a system 100, according to an embodiment, to manage software vulnerabilities. The system 100 may include a networked system 102, a network 109, and a client machine 108. The networked system 102 includes a production machine 104, and a backup machine 106 (e.g., backup appliance) that is communicatively coupled to a database 107. The client machine 108 communicates over the network 109 (e.g., Internet) with the networked system 102. The networked system 102 may be embodied as a networked computing environment where the production machine 104, the backup machine 106, and the database 107 are interconnected through one or more public and/or proprietary networks (e.g., Microsoft® provider of Azure Cloud Computing Platform & Services, Amazon provider of Amazon Web Services, and the like), as offered by Rubrik Inc., of Palo Alto, California. According to another embodiment, the system 100 may be implemented as a single software platform that delivers backup, instant recovery, archival, search, analytics, compliance, and copy data management in one secure fabric across data centers and clouds as also offered by Rubrik Inc., of Palo Alto, California.

The production machine 104 may be utilized for the production of goods or services. The production machine 104 is periodically backed up by the backup machine 106 to facilitate its restoration in the event of a failure (e.g., ransomware). For example, a snapshot image 118 of the production machine 104 may be periodically taken by the backup machine 106 and stored in the database 107 at a recovery point that is identified with a recovery point identifier (e.g., "TIME 0," "TIME 1", and the like). The production machine 104 may include one or more elements of hypervisor information 110. Each element of the hypervisor information 110 may include a hypervisor 112 that supervises one or more virtual machines 114. Each of the virtual machines 114 includes software information 116 that may be patched (e.g., update a module, install a module, uninstall a module, application of binary code, reconfiguration, and the like), as described further below.

The backup machine 106 manages the snapshot images 118 of the production machine 104, identifies software vulnerabilities in a snapshot image 118 retrieved from the database 107, pushes patch information to the production machine 104 to remediate the identified software vulnerabilities. In addition, the backup machine 106 presents electronic user interfaces to the client machine 108. The backup machine 106 may perform the aforementioned management and presentation operations with a receiving module 120 and a processing module 122. The receiving module 120 may be utilized for receiving electronic messages (e.g., commands, messages, events, triggers, and the like), over a network, and the processing module 122 may be utilized for processing the electronic messages and other work.

The backup machine 106 manages snapshot images 118 by periodically taking a snapshot image 118 of the production machine 104 (e.g., operation "A") and storing the snapshot image 118 as snapshot information 124 in the database 107 (e.g., operation "B"). For example, the backup machine 106 may periodically take a snapshot image 118 of the production machine 104 at "TIME 0" (e.g., recovery point 1), "TIME 1" (e.g., recovery point 2), "TIME 2" (e.g., recovery point 3) and so forth. In other embodiments, the backup machine 106 may take a snapshot image 118 of the production machine 104 responsive to detecting a trigger. For example, the trigger may include receiving a request from the client machine 108 (e.g., take a snapshot image), receiving an event from the production machine 104 (e.g., identification of a checksum failure), receiving an external event (e.g., receiving an electronic message describing a Common Vulnerability and Exposure (CVE®) that is new), or the like. The CVE may be received from a reporting node (not shown). The CVE includes a list of "information security vulnerabilities" and "information security exposures" both including common names (e.g., CVE identifiers) for publicly known problems. An "information security vulnerability" is a mistake in software that can be directly used by a hacker to gain access to a system or network. An "information security exposure" is a mistake in software that allows access to information or capabilities that can be used by a hacker as a stepping-stone into a system or network. The CVE may further include a CVE identifier number, an indication of an "entry" or "candidate" status, a brief description of the security vulnerability or exposure, pertinent references (e.g., vulnerability reports and advisories), and so forth.

The backup machine 106 identifies software vulnerabilities in a snapshot image 118 retrieved from the database 107 and pushes patch information to the production machine 104 to remediate the identified software vulnerabilities. The backup machine 106 manages the patches by retrieving a snapshot image 118 from (the snapshot information 124 in) the database 107 (e.g., operation "C"), processing each of the virtual machines 114 in the snapshot image 118 based on vulnerability information 126 (e.g., operation "D") to identify whether a software vulnerability (vulnerability event) is present in a virtual machine 114, pushing patch information to a virtual machine 114 on the production machine 104 (e.g., operation "E") responsive to identifying a patch for the software vulnerability with, and storing an archive event in the archive information 128 (e.g., operation "F") in the database 107 to chronicle the identification (and possible remediation) of the software vulnerability.

The vulnerability information 126 includes vulnerability events. Each vulnerability event chronicles a software vulnerability (e.g., CVEs, etc.) and may include patch information to remediate the software vulnerability. The vulnerability events are utilized to identify whether a software vulnerability exists in the snapshot image 118.

The archive information 128 includes archive events. Each archive event includes a snapshot image 118 and chronicles software vulnerabilities identified for each virtual machine 114 in the snapshot image 118. Each archive event further chronicles whether a patch was applied (e.g., pushed) to a virtual machine 114. The snapshot information 124, vulnerability information 126, and the archive information 128 are stored in the database 107.

The backup machine 106 may present electronic user interfaces on the client machine 108. For example, the backup machine 106 may receive a command from the client machine 108 to present an electronic user interface on the client machine 108 and present a (graphical) report of software vulnerabilities for a particular virtual machine 114.

The system 100 provides a technical solution to a technical problem. The technical problem is how to remediate software vulnerabilities in a production machine 104 without incurring the engineering complexity of software agents. For example, patch management systems typically deploy software agents for installation in the nodes of the various software systems to enable the implementation of a standard communications protocol across the heterogenous software environments. Nevertheless, deploying and maintaining the software agents in the heterogenous systems creates engineering and operational burdens that are undesirable. The technical solution to the technical problem is to identify software vulnerabilities in a snapshot image 118 of the production machine 104 that are retrieved from the database 107 rather than the production machine 104. Identification of software vulnerabilities in a snapshot image 118 are retrieved from the database 107 enables the remediation of the identified software vulnerabilities on the production machine 104 without deploying a software agent and maintaining the software agent on the production machine 104.

Figure 2A:
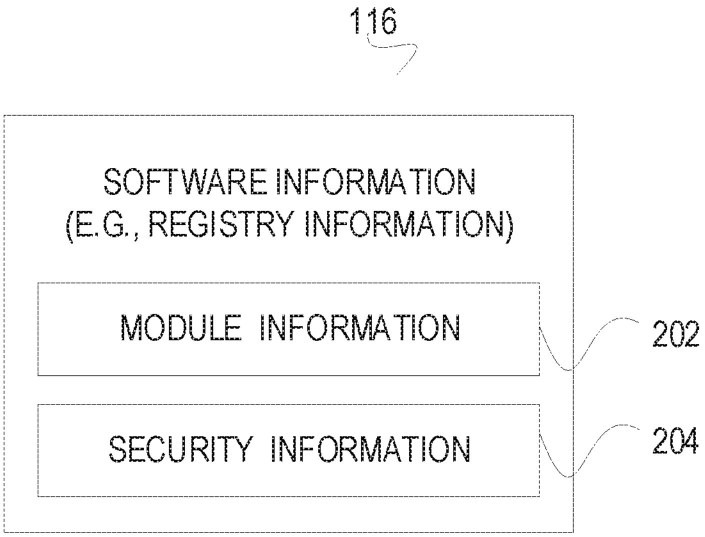
FIG. 2A is a block diagram illustrating software information, according to an embodiment.

FIG. 2A is a block diagram illustrating software information 116, according to an embodiment. Recall that the software information 116 is included in each virtual machine 114 on the production machine 104 (not shown) and backed up as snapshot information 124 to the database 107 (not shown). The software information 116 may be retrieved from the database 107, by the backup machine 106, and searched for software vulnerabilities. For example, the software information 116 may be embodied as the Microsoft Windows® registry or the Linux® package status file.

The software information 116 may include module information 202, security information 204, and other types of information. The module information 202 may include a list of software applications (e.g., software modules, firmware modules, etc.) that are installed on the virtual machine 114. For example, the module information 202 may include a list of software identifiers that respectively identify software applications that are installed on the virtual machine 114. The security information 204 may include configuration information (e.g., firewall configuration information, file sharing configuration information, and/or network configuration information) or other information for configuring a virtual machine 114.

Figure 2B:
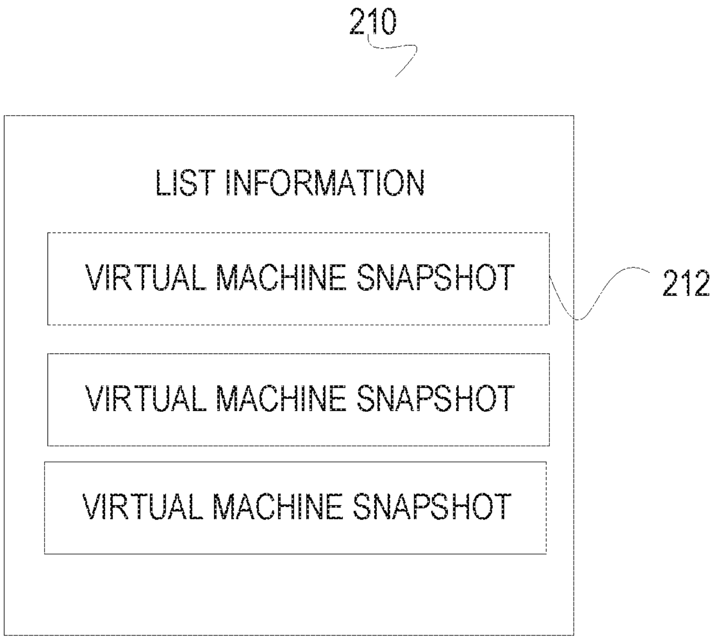
FIG. 2B is a block diagram illustrating list information, according to an embodiment.

FIG. 2B is a block diagram illustrating list information 210, according to an embodiment. The list information 210 may be generated based on a snapshot image 118. The list information 210 may include one or more virtual machine snapshots 212. Each virtual machine snapshot 212 corresponds to a virtual machine 114 in the snapshot image 118.

Figure 2C:
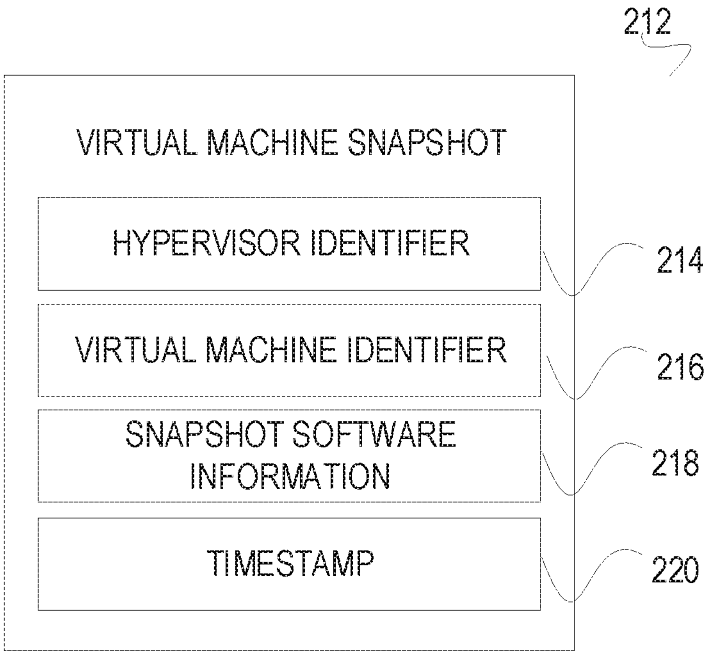
FIG. 2C is a block diagram illustrating virtual machine snapshot, according to an embodiment.

FIG. 2C is a block diagram illustrating virtual machine snapshot 212, according to an embodiment. The virtual machine snapshot 212 is generated based on software information 116 associated with a virtual machine 114. The virtual machine snapshot 212 may include a list of installed software modules and security configurations identified in a virtual machine 114. The virtual machine snapshot 212 may include a hypervisor identifier 214 identifying a hypervisor 112 on the production machine 104, a virtual machine identifier 216 identifying a virtual machine 114 in the hypervisor information 110, snapshot software information 218, and a timestamp 220. The snapshot software information 218 includes a list of installed software modules, configuration information, and other information. The installed software modules, configuration information, and other information are identified in the software information 116 associated with the identified virtual machine 114. For example, the list of software modules may include a list of module names and their associated version numbers. Further for example, the list of configuration information (e.g., firewall configuration information, file sharing configuration information, and/or network configuration information) may include a list of configuration names associated with one or more configuration values. The timestamp 220 includes a date and time the virtual machine snapshot 212 was chronicled. For example, the timestamp 220 may include the date and the time the virtual machine snapshot 212 was written to the list information 210.

Figure 2D:
FIG. 2D is a block diagram illustrating vulnerability information, according to an embodiment.

FIG. 2D is a block diagram illustrating vulnerability information 126, according to an embodiment. The vulnerability information 126 describes software vulnerabilities (e.g., CVEs, as previously described). The vulnerability information 126 includes one or more vulnerability events 224 that respectively correspond to a software vulnerability (e.g., CVE). A vulnerability event 224 may be added to the vulnerability information 126 responsive to the software vulnerability (e.g., CVE) becoming known publicly. For example, the backup machine 106 may receive an electronic message, including a CVE, responsive to responsive to the software vulnerability (e.g., CVE) becoming known publicly. The backup machine 106 may add the vulnerability event 224 to the vulnerability information 126 responsive to receipt of the electronic message. In another example, a user may add a vulnerability event 224 to the vulnerability information 126 by utilizing the client machine 108.

Figure 2E:
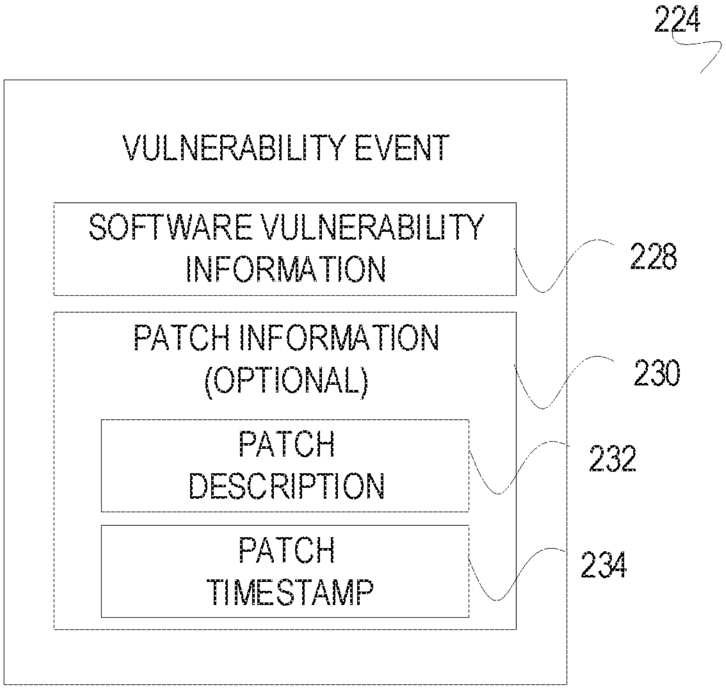
FIG. 2E is a block diagram illustrating a vulnerability event, according to an embodiment.

FIG. 2E is a block diagram illustrating vulnerability event 224, according to an embodiment. The vulnerability event 224 describes a single software vulnerability. For example, the vulnerability event 224 may describe a CVE (e.g., CVE #1234). The vulnerability event 224 includes software vulnerability information 228 describing the software vulnerability (described further below), and (optional) patch information 230. The patch information 230 is optional because a patch may not exist at the time the vulnerability event 224 is added to the vulnerability information 126. It follows, the patch information 230 may be subsequently added to the vulnerability event 224 when a patch is developed. The patch information 230 may include a patch description 232 and a patch timestamp 234. The patch description 232 includes a software remediation for the software vulnerability. For example, the patch description 232 may include a software module, a software patch, reconfiguration information, or the like. The software module may be a later version of the software module that remediates a software vulnerability. The software module may be utilized to remediate the software vulnerability by replacing an earlier version of the software module on the production machine 104. Further for example, the patch description 232 may include binary code for overwriting the contents of one or more addresses on the production machine 104. Further for example, the reconfiguration information may include a configurable parameter identifier and one or more values for reconfiguring the configurable parameter that is being identified. In one embodiment, the patch description 232 may include a script. For example, the script may be utilized for pushing a patch to the production machine 104 and for applying the patch on production machine 104. Further for example, the script may cause an installation of a software module, an application of a software patch, or a reconfiguration of a configurable parameter. The patch timestamp 234 chronicles an earliest availability of the patch information (e.g., writing of the patch information (e.g., patch) to the vulnerability event 224).

Figure 2F:
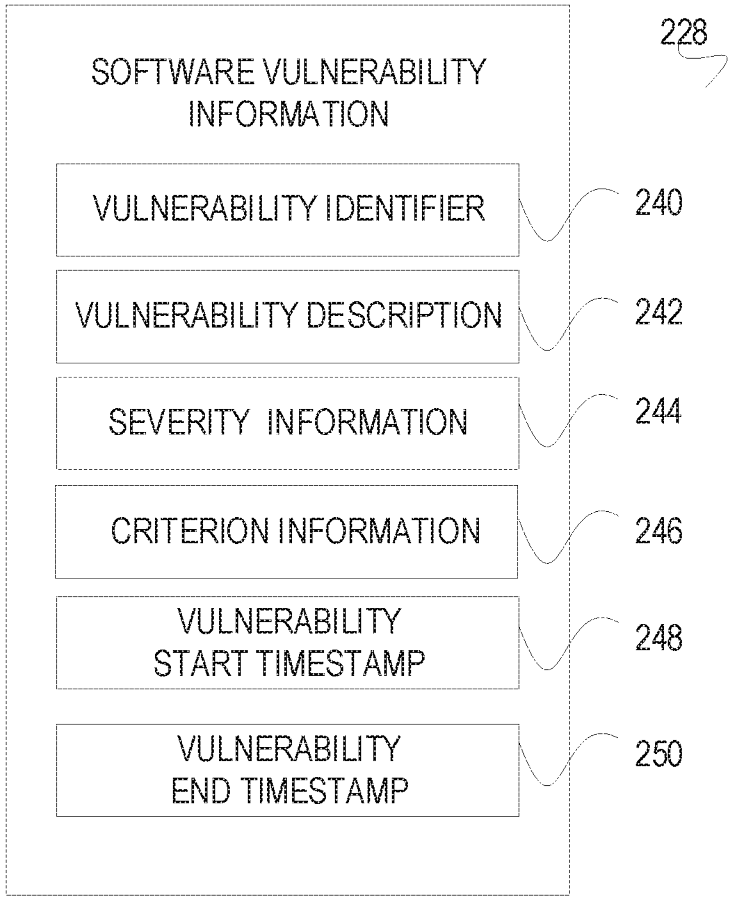
FIG. 2F is a block diagram illustrating software vulnerability information, according to an embodiment.

FIG. 2F is a block diagram illustrating software vulnerability information 228, according to an embodiment. The software vulnerability information 228 describes the software vulnerability in further detail. The software vulnerability information 228 may include a vulnerability identifier 240, a vulnerability description 242, severity information 244, criterion information 246, a vulnerability start timestamp 248 (e.g., start date), and a vulnerability end timestamp 250 (e.g., end date). The vulnerability identifier 240 uniquely identifies the software vulnerability from the other software vulnerabilities. The vulnerability description 242 describes the software vulnerability. For example, the vulnerability description 242 may describe the symptoms of the software vulnerability and/or include a vulnerability name (e.g., a common name for a publicly known problem) (e.g., CVE). The severity information 244 includes a ranking of the severity of the software vulnerability (e.g., "LOW" or "HIGH"). The criterion information 246 provides a means for identifying the software vulnerability. For example, the criterion information 246 may provide a means for identifying the software vulnerability in the snapshot image 118. The criterion information 246 may include a blacklist, a whitelist, a snippet of binary code, a snippet of source code, a configurable parameter identifier associated with parameter information, and the like. The blacklist identifies one or more modules (e.g., versions of modules) that should not be installed in the virtual machine 114. If, for example, a virtual machine 114 in a snapshot image 118 included a module on the blacklist, then the virtual machine 114 would exhibit the software vulnerability. The whitelist identifies one or more modules (e.g., versions of modules) that should be installed in the virtual machine 114. If, for example, a virtual machine 114 included a module not on the whitelist, then the virtual machine 114 would exhibit the software vulnerability. The snippet of binary code should not be found in the snapshot image 118. If, for example, a virtual machine 114 included the binary code, then the virtual machine 114 would exhibit the software vulnerability. The snippet of source code (e.g., module name, version number, etc.) should not be found in the snapshot image 118. If, for example, a virtual machine 114 included the snippet of source code, then the virtual machine 114 would exhibit the software vulnerability. The vulnerability start timestamp 248 chronicles the time the vulnerability became publicly known (e.g., based on CVE). The vulnerability end timestamp 250 chronicles the earliest time the vulnerability might be retired (e.g., date and time updated source code became available).

Figure 2G:
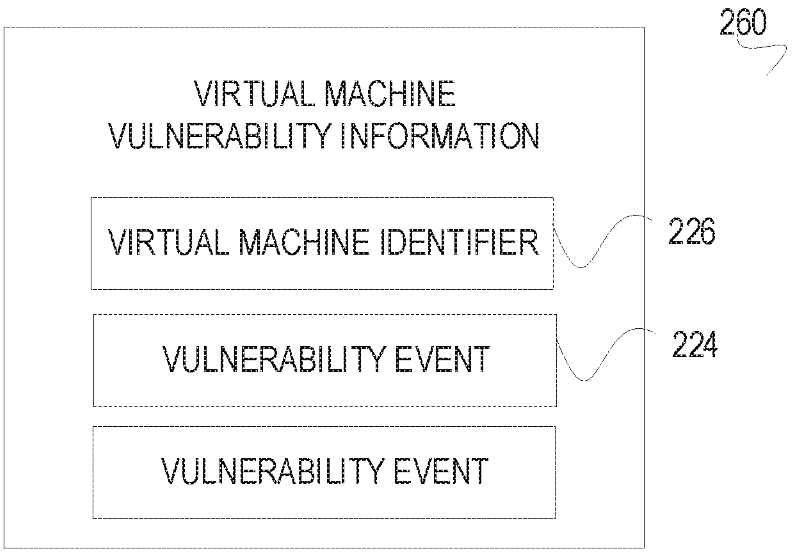
FIG. 2G is a block diagram illustrating virtual machine vulnerability information, according to an embodiment.

FIG. 2G is a block diagram illustrating virtual machine vulnerability information 260, according to an embodiment. The virtual machine vulnerability information 260 includes a virtual machine identifier 226 and one or more vulnerability events 224. The virtual machine vulnerability information 260 chronicles the results of comparing the list information 210 with vulnerability information 126. The virtual machine vulnerability information 260 identifies whether a virtual machine 114 has a software vulnerability and whether a patch is available for application to the virtual machine 114. The virtual machine identifier 226 uniquely identifies a virtual machine 114 on the production machine 104. Each vulnerability event 224 chronicles whether a software vulnerability is identified in the virtual machine 114 and whether a patch is available for application to the virtual machine 114. The virtual machine vulnerability information 260 is stored in the archive information 128 to chronicle software vulnerabilities for a specific virtual machine 114 in association with an archive event timestamp and a snapshot image 118.

Figure 2H:
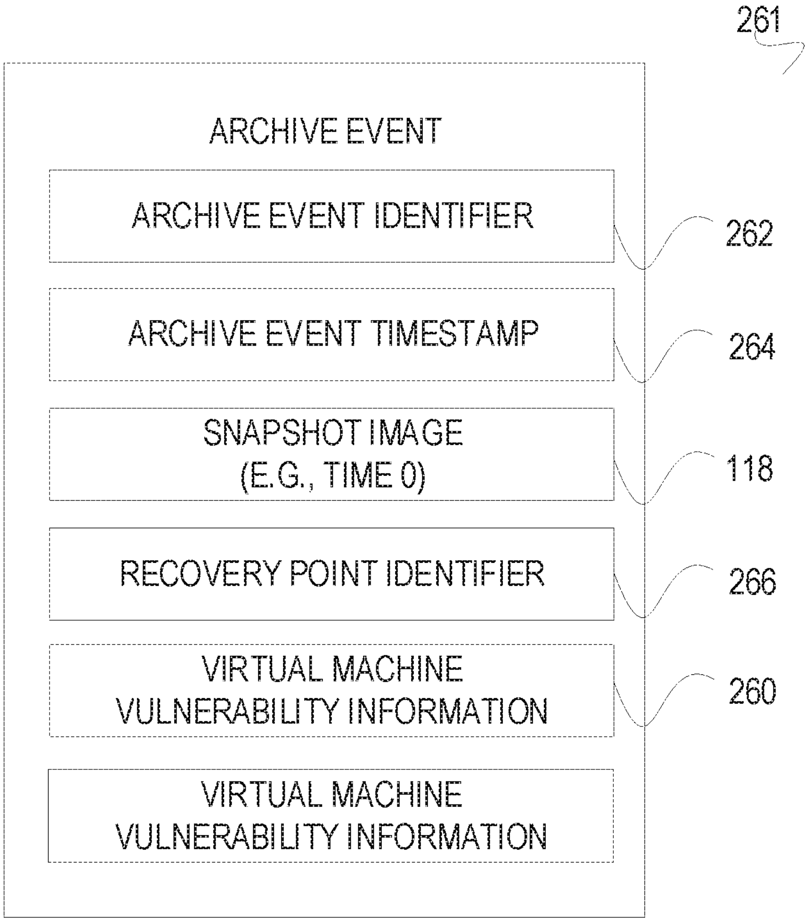
FIG. 2H is a block diagram illustrating an archive event, according to an embodiment.

FIG. 2H is a block diagram illustrating an archive event 261, according to an embodiment. The archive event 261 may be added to the archive information 128 responsive to retrieval of a snapshot image 118 from the database 107 and processing the snapshot image 118. The archive event 261 may include an archive event identifier 262 that uniquely identifies the archive event 261, an archive event timestamp 264 chronicling the addition of the archive event 261 to the archive information 128, the snapshot image 118 that was processed, a recovery point identifier 266 that uniquely identifies the snapshot image 118 from other snapshot images 118, and one or more elements of virtual machine vulnerability information 260. Recall that each element of the virtual machine vulnerability information 260 chronicles the identification of one or more software vulnerabilities on a virtual machine 114 and whether a patch was applied to the virtual machine 114 on the production machine 104. In one embodiment, the archive event 261 may include a snapshot image identifier instead of the snapshot image 118. The archive event timestamp 264 chronicles the archiving of the snapshot image 118 in the database 107.

FIG. 3A is a block diagram illustrating a method 300, according to an embodiment, to manage software vulnerabilities. Illustrated on the left are operations performed by the production machine 104 and illustrated in the middle and on the right are operations performed by the backup machine 106 (e.g., backup appliance). The method 300 commences at operation 302 with the backup machine 106 communicating a request, over a network to the production machine 104, for a snapshot image 118 of the production machine 104. The request may be initiated by different entities. For example, the request may be initiated based on a periodic timeout, as illustrated in operation 398 of FIG. 3C. Further for example, the request may be initiated responsive to the receiving module 120 receiving a command from the client machine 108.

At operation 304, the production machine 104 receives the request and, at operation 306, takes the snapshot image 118. At operation 308, the production machine 104 communicates the snapshot image 118 to the backup machine 106.

At operation 310, the backup machine 106 receives the snapshot image 118 and stores the snapshot image 118 in the database 107. For example, the backup machine 106 may store the snapshot image 118 in the snapshot information 124 in the database 107 in associating with a recovery point identifier that uniquely identified the snapshot image 118.

At operation 311, at the backup machine 106, the receiving module 120 receives a request (e.g., electronic message) to retrieve a snapshot image 118 from the database 107, identifies whether one or more virtual machines 114 in the snapshot image 118 includes a software vulnerability in the vulnerability information 126, and pushes software patch information to the production machine causing an application of a patch to one or more virtual machines 114 on the production machine 104. The request may be for different types of snapshot images 118. For example, the receiving module 120 may receive a request to retrieve the most recent snapshot image 118 stored in the database 107. In another example, the receiving module 120 may receive a request to retrieve a snapshot image 118 from the snapshot information 124 based on a recovery point identifier that uniquely identifies the snapshot image 118. Further, the request may be received from different network entities. For example, the receiving module 120 may receive the request from the client machine 108. Further for example, the receiving module 120 may receive a request from a network entity that is triggered based on a timeout, as illustrated in operation 399 of FIG. 3D. In another embodiment, the receiving module 120 may receive a request responsive to a snapshot image 118 being stored in the database 107 as snapshot information 124, as illustrated in operation 310 on FIG. 3A. In another embodiment, the receiving module 120 may receive a request responsive to registration of a new software vulnerability to a virtual machine 114, as illustrated in operation 640 on FIG. 6B.

At operation 312, the processing module 122 retrieves the snapshot image 118 from the database 107. For example, the processing module 122 may retrieve the most recent snapshot image 118 based on the request.

At operation 314, the processing module 122 processes the snapshot image 118 to identify software vulnerabilities. For example, the processing module 122 may generate list information 210 based on the software information 116 and compare the list information 210 with the vulnerability information 126 to identify software vulnerabilities.

At decision operation 316, the processing module 122 identifies whether a software patch is available for one or more software vulnerabilities that are identified in operation 314. For example, the vulnerability information 126 may indicate that patch information is available for a software vulnerability. If the processing module 122 identifies a software patch is available, then a branch is made to operation 318. Otherwise processing ends.

At operation 318, the processing module 122 pushes software patch information (e.g., patch) over the network to the production machine 104. In one embodiment, the processing module 122 may push the software patch information to the production machine 104 to update a module in a virtual machine 114 in the production machine 104. For example, pushing the software patch information to the production machine 104 may cause a script to execute on the production machine 104. The operations 314, 316, and 318 are collectively identified as operations 319 and described in further detail on FIG. 3B.

At operation 320, the production machine 104 receives the patch information (e.g., patch) and, at operation 322, the production machine 104 installs the patch. For example, the patch information may include a script that is executed by the production machine 104 to update a module in a virtual machine 114 or to apply a patch to the image on the production machine 104.

Figure 3B:
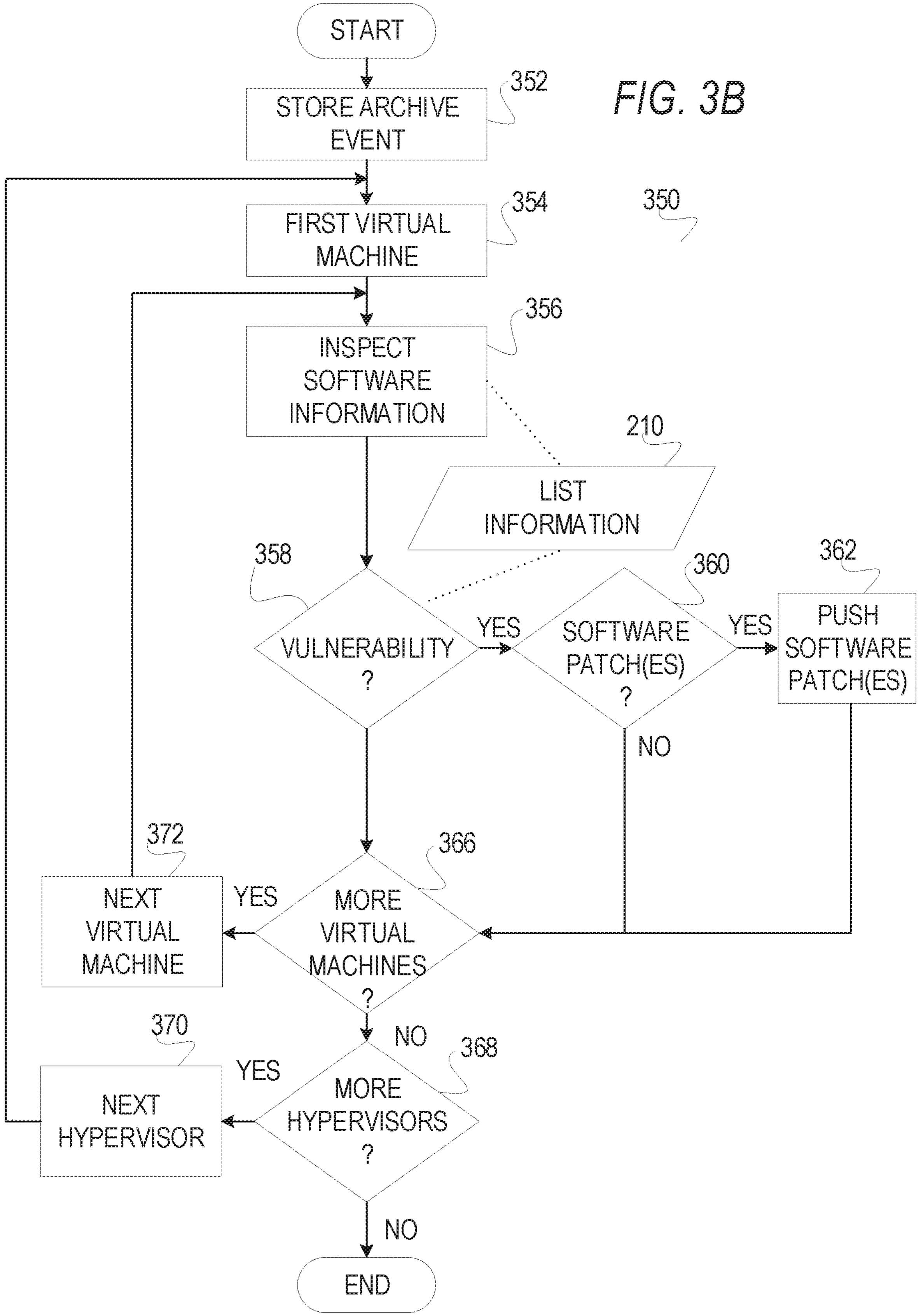
FIG. 3B is a block diagram illustrating a method, according to an embodiment, to process software information.

FIG. 3B is a block diagram illustrating a method 350, according to an embodiment, to process software information 116. The method 350 provides further description of the operations 319 on FIG. 3A. The method 350 commences, at operation 352, with the processing module 122 initializing and storing an archive event 261 in the archive information 128. The processing module 122 may initialize and store the archive event 261 responsive to a retrieval of a snapshot image 118 from the database 107, as described in operation 312. The archive event 261 may be initialized with an archive event identifier 262, the archive event timestamp 264 including the current time, the snapshot image 118 that was retrieved from the database 107 (or a pointer to the snapshot image 118), and the recovery point identifier 266 identifying the snapshot image 118, all as previously described. At operation 354, the processing module 122 initializes the method 350 to the first virtual machine 114 in the snapshot image 118.

At operation 356, the processing module 122 generates the list information 210 based on the first virtual machine 114. The processing module 122 may generate the list information 210 by inspecting the virtual machine 114 currently being processed, generating a virtual machine snapshot 212, and storing the virtual machine snapshot 212 in the list information 210. In one example, the processing module 122 may inspect the software information 116 (e.g., software registry, Windows Registry or the Linux Package Status file) to generate a list of installed software. In another example, the processing module 122 may inspect the software information 116 (e.g., software registry, Windows Registry or the Linux Package Status File) to generate a list of security related information (e.g., firewall information, file share information, and/or configuration information such as network configurations).

At decision operation 358, the processing module 122 identifies whether the virtual machine 114 that is being processed includes one or more software vulnerabilities. For example, the processing module 122 may compare the snapshot software information 218 that was generated by inspecting virtual machine 114 with the each of the vulnerability events 224 in the vulnerability information 126. Recall that a vulnerability event 224 characterizes a software vulnerability. If the virtual machine 114 includes one or more software vulnerabilities, then a branch is made to operation 360. Otherwise, a branch is made to decision operation 366. The decision operation 358 is further described in FIG. 3C.

At decision operation 360, the processing module 122 identifies whether patch information 230 is available for one or more software vulnerabilities identified in the virtual machine 114 being processed. For example, the processing module 122 may process each of the vulnerability events 224 associated with the virtual machine 114 being processed to identify whether patch information 230 is available. If patch information 230 is available, then a branch is made to decision operation 362. Otherwise, a branch is made to decision operation 366. At operation 362, the processing module 122 pushes patch information (e.g., first patch information) to the production machine 104 to remediate software vulnerability (ies). In one embodiment, the patch information is communicated separately for each software vulnerability. In another embodiment, the patch information is a single communication that is communicated to the virtual machine 114 for all of the software vulnerabilities identified.

At decision operation 366, the processing module 122 identifies whether more virtual machines 114 are in the snapshot image 118. If more virtual machines 114 are in the snapshot image 118, then a branch is made to operation 372. Otherwise, a branch is made to decision operation 368. At operation 372, the processing module 122 advances to the next virtual machine 114 in the hypervisor information 110 (production machine 104). At decision operation 368, the processing module 122 identifies whether more hypervisor information 110 is included in the snapshot image 118. If more hypervisor information 110 is included in the snapshot image 118, then a branch is made to operation 370. Otherwise, processing ends. At operation 370, the processing module 122 advances to the next element of hypervisor information 110 in the snapshot image 118.

Figure 3C:
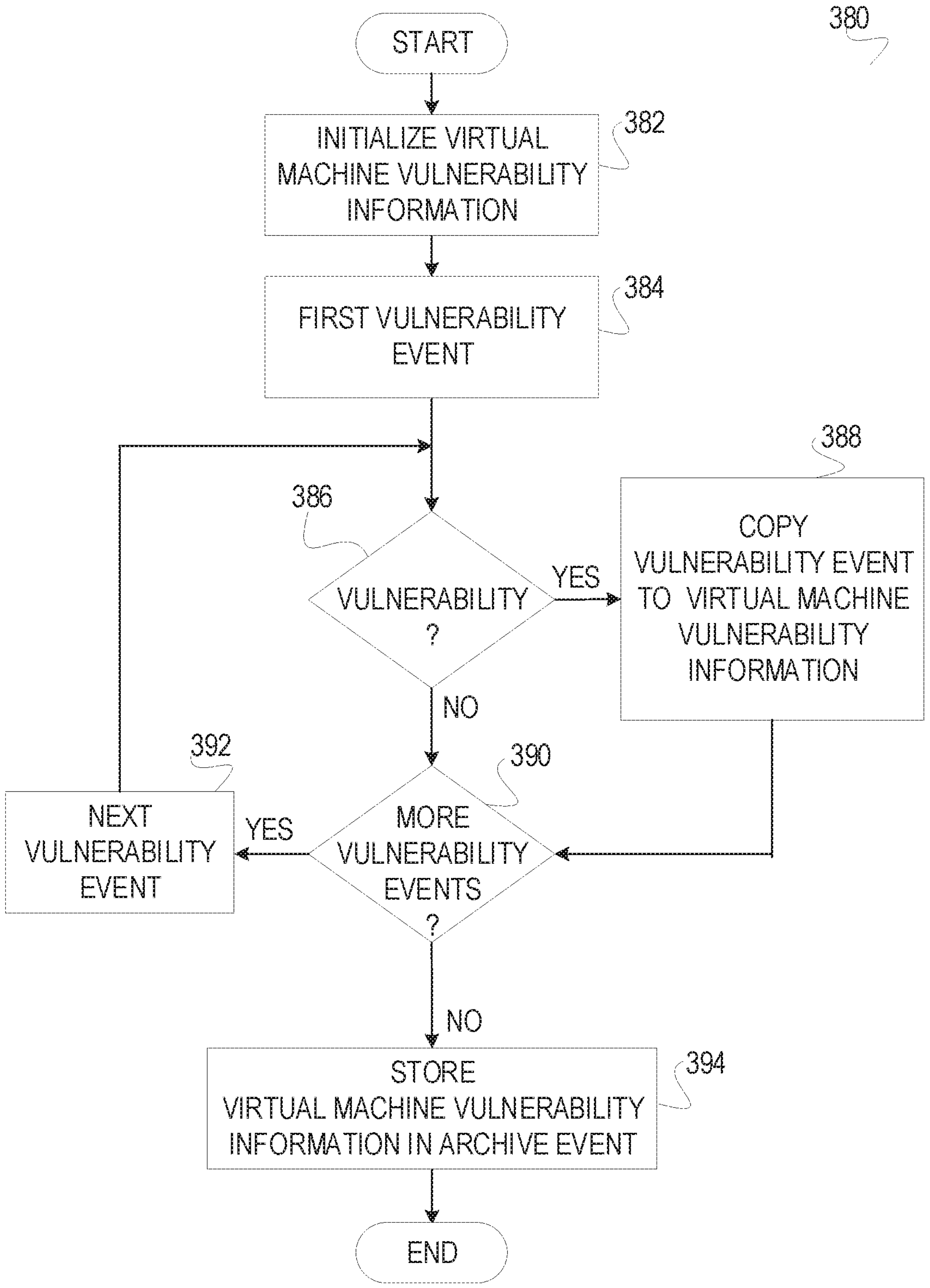
FIG. 3C is a block diagram illustrating a method, according to an embodiment, to identify software vulnerabilities in a virtual machine.

FIG. 3C is a block diagram illustrating a method 380, according to an embodiment, to identify software vulnerabilities in a virtual machine 114. The method 380 provides a detailed description of decision operations 358 in FIG. 3B. The method 350 commences, at operation 382, with the processing module 122 initializing an element of virtual machine vulnerability information 260. The processing module 122 initializes the virtual machine vulnerability information 260 by storing a virtual machine identifier 226 for the virtual machine 114 in the virtual machine vulnerability information 260. For example, the processing module 122 initializes the virtual machine vulnerability information 260 by storing a virtual machine identifier 226 for the virtual machine 114 currently being processed. At operation 384, the processing module 122 advances to the first vulnerability event 224 in the vulnerability information 126. At decision operation 386, the processing module 122 identifies whether the criterion information 246 (included in the current vulnerability event 224) (e.g., known CVE) matches any part of the virtual machine 114 (e.g., software information 116). For example, the processing module 122 may identify whether the criterion information 246 matches any part of the part of the snapshot software information 218 for the virtual machine 114 in the list information 210. If the processing module 122 identifies that the criterion information 246 matches at least a portion of the virtual machine 114 then a branch is made to operation 388. Otherwise a branch is made to decision operation 390. At operation 388, the processing module 122 copies the vulnerability event 224 that is currently being processed to the virtual machine vulnerability information 260 (e.g., chronicles that current state of the vulnerability event 224 including whether patch information 230 (e.g., patch) is available). At decision operation 390, the processing module 122 identifies whether more vulnerability events 224 are registered in vulnerability information 126. If more vulnerability events 224 are in the vulnerability information 126 then a branch is made to operation 392. Otherwise a branch is made to operation 394. At operation 392, the processing module 122 advances to the next vulnerability event 224 in the vulnerability information 126. At operation 394, the processing module 122 stores the virtual machine vulnerability information 260 for the virtual machine 114 in the archive event 261 for the snapshot image 118 being processed and processing ends.

Figure 3D:
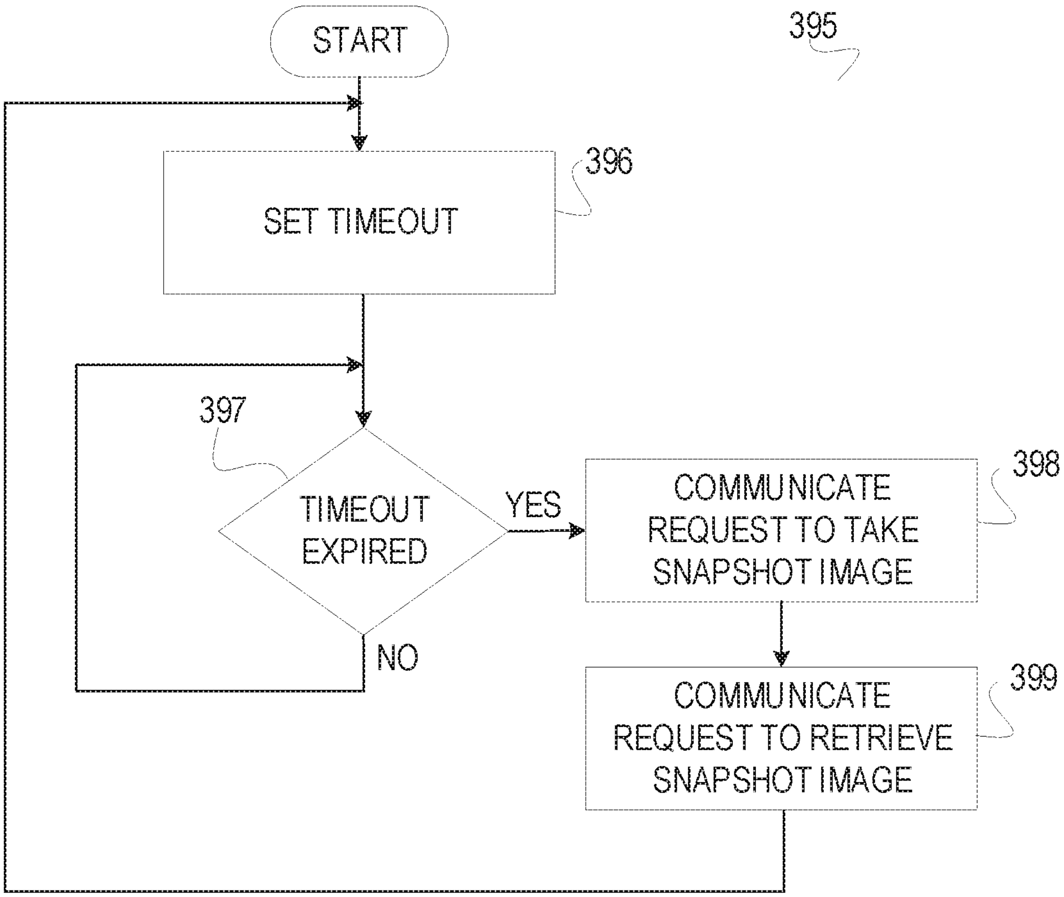
FIG. 3D is a block diagram illustrating a method, according to an embodiment, to communicate requests based on a timeout.

FIG. 3D is a block diagram illustrating a method 395, according to an embodiment, to communicate a request based on a timeout. The method 395 may performed on the backup machine 106. At operation 396, the processing module 122 sets a timeout. For example, the processing module 122 may set a timeout of 6 hours. At decision operation 397, the processing module 122 identifies whether the timeout is expired. If the processing module 122 identifies the timeout is expired, then a branch is made to operation 398. Otherwise a branch is made to decision operation 397. At operation 398, the processing module 122 communicates a request to take a snapshot image 118 of the production machine 104 and store the snapshot image as snapshot information 124 on the database 107. For example, the operation 398 may be embodied as the operation 302 on FIG. 3A. At operation 399, the processing module 122 communicates a request to retrieve a snapshot image 118 from snapshot information 124 on the database 107 and store the snapshot image 118 in the archive information 128 in the database 107. The request may be processed in operation 311 of FIG. 3A.

Figure 4A:
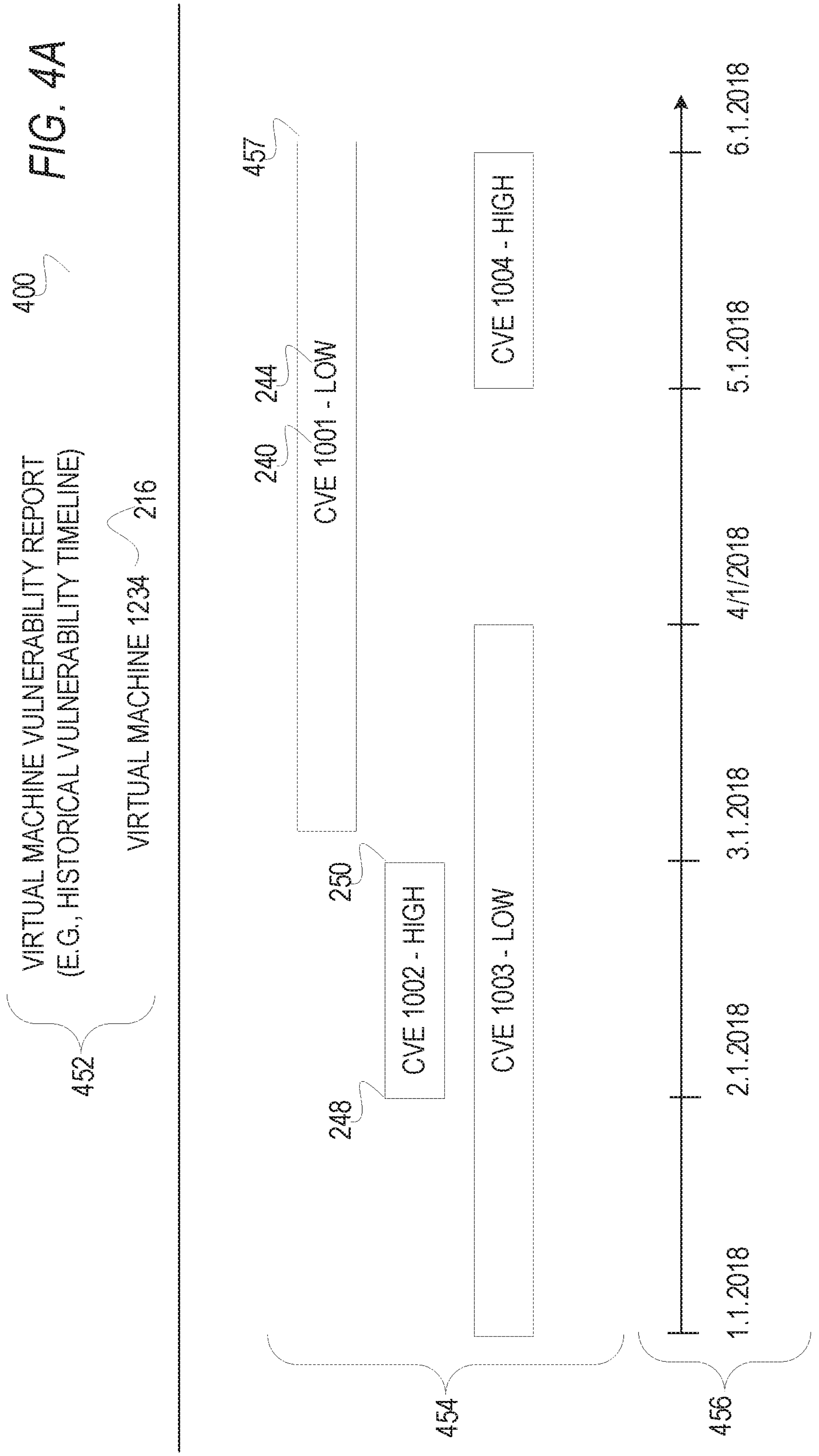
FIG. 4A is a block diagram illustrating an electronic user interface, according to an embodiment, for a presentation of a graphic vulnerability report for a virtual machine.

FIG. 4A is a block diagram illustrating an electronic user interface 400, according to an embodiment, presenting a graphic vulnerability report for a virtual machine 114 (e.g., first electronic user interface). The electronic user interface 400 includes title information 452, software vulnerability information 454 (CVE), timeline information 456, and histogram bars including histogram bar 457. The title information 452 includes the title, "VIRTUAL MACHINE VULNERABILITY REPORT" (E.G., HISTORICAL VULNERABILITY TIMELINE) and "VIRTUAL MACHINE" including a virtual machine identifier 216, "1234." The software vulnerability information 454 includes histogram bars where each histogram bar signifies a CVE including the vulnerability identifier 240 and the severity information 244. In addition, the histogram bars are registered in accordance with the timeline information 456. For example, each histogram bar is graphical presentation of a software vulnerability on the virtual machine showing a start time of the software vulnerability (e.g., start timestamp 248) (e.g., left end) and the end time of the software vulnerability (end timestamp 250) (e.g., right end). Note that the histogram bar 457 is open ended on its right end indicating "CVE 1001" remains unresolved.

FIG. 4B is a block diagram illustrating an electronic user interface 460, according to an embodiment, presenting a vulnerability report for a virtual machine 114 (e.g., first electronic user interface). The electronic user interface 460 includes title information 461, column information 462, and row information 465. The title information 461 includes the title "VULNERABILITY REPORT" and "VIRTUAL MACHINE" including a virtual machine identifier 216, "1234." The row information 465 includes rows that respectively correspond to a CVE. The column information 462 includes columns 464, 466, 468, and 472. The column 464 presents the vulnerability start timestamp 248. The column 466 presents the vulnerability end timestamp 250. The column 468 presents the vulnerability description 242 and the column 472 presents the severity information 244.

Figure 5A:
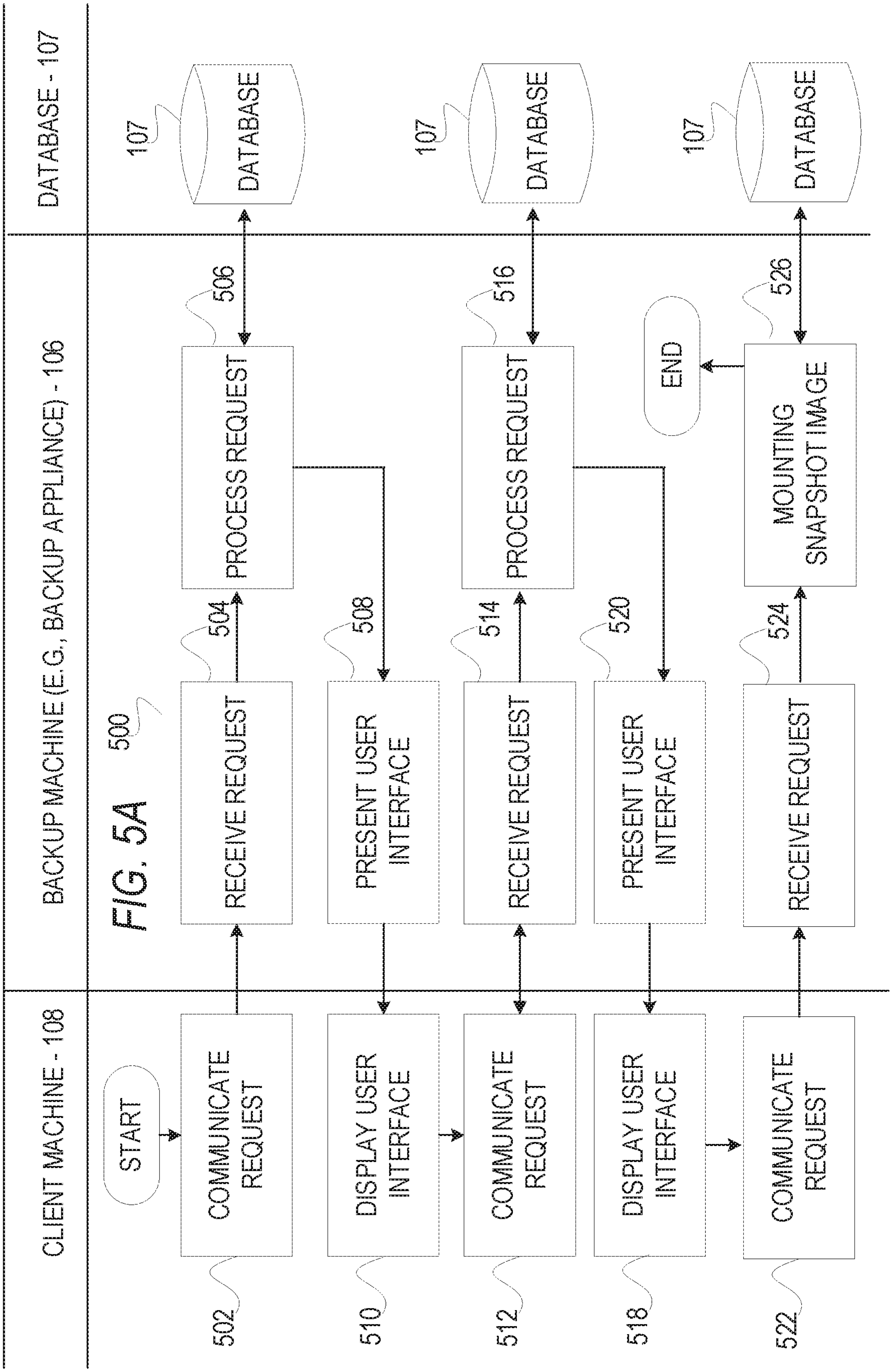
FIG. 5A is a block diagram illustrating a method to facilitate an analysis of a software vulnerability, according to an embodiment.

FIG. 5A is a block diagram illustrating a method 500 to facilitate an analysis of a software vulnerability, according to an embodiment. The method 500 illustrates operations performed by the client machine 108 on the left, operations performed by the backup machine 106 in the middle, and the database 107 on the right. The method 500 commences at operation 502 with the client machine 108 communicating a request over a network (e.g., network 109 and networks included in the networked system 102, and the like) to the backup machine 106. For example, the client machine 108 may communicate a request to present software vulnerabilities for a virtual machine 114 on a production machine 104 (not shown). The request includes a virtual machine identifier that identifies the virtual machine 114.

At operation 504, at the backup machine 106, the receiving module 120 receives the request. For example, the request (e.g., first request) includes a request to present software vulnerabilities for the virtual machine 114 and a virtual machine identifier identifying the virtual machine 114 on the production machine 104.

At operation 506, the processing module 122 processes the request. For example, the processing module 122 may access the archive information 128 in the database 107 to identify software vulnerabilities associated with the virtual machine 114 identified. At operation 508, the processing module 122 presents a user interface (e.g., first electronic user interface) over the network to the client machine 108. For example, the processing module 122 may present the user interface 400 as illustrated in FIG. 4A or the user interface 460 as illustrated in FIG. 4B.

At operation 510, the client machine 108, receives and displays the user interface (e.g., first electronic user interface). At operation 512, the client machine 108 receives a selection (e.g., second selection) identifying a set of user interface elements (e.g., first set of user interface elements) and communicates a request (e.g., second request) to the backup machine 106 responsive to receiving the selection. For example, the first set of user interface elements may include the histogram bar 457, illustrated on FIG. 4A, corresponding to "CVE 1001." Further for example, the first set of user interface elements may include the first row 465, illustrated on FIG. 4B, corresponding to "CVE 1001."

At operation 514, the processing module 122 receives the request (second request) from over the one or more networks. For example, the request may include the selection (e.g., software vulnerability identifier—"CVE 1001") identifying a software vulnerability (e.g., first software vulnerability) and a virtual machine identifier identifying the virtual machine 114 on the production machine 104. At operation 516, the processing module 122 processes the request. For example, the processing module 122 may process the request (e.g., second request) to identify snapshot images 118 (e.g., first plurality of snapshot images) in the in the database 107 that includes the software vulnerability in the identified virtual machine 114. In one embodiment, the processing module 122 may identify the snapshot images 118 by identifying archive events 261 that associate the virtual machine identifier 226 with the vulnerability identifier 240 and a snapshot image 118 (or a snapshot image identifier). At operation 520, the processing module 122 presents, over the network(s), at least one electronic user interface (e.g., second electronic user interface) to enable the receiving of a selection to mount a snapshot image 118. For example, the electronic user interface(s) presented via operation 520 may include a "YEAR" view and/or a "MONTH" view and/or a DAY view, as described and illustrated in FIG. 5B. The three views facilitate a selection of user interface elements on the "DAY" view representing recovery point identifiers identifying snapshot images 118 that include the virtual machine 114 with the software vulnerability. For example, the processing module 122 may present the user interface 480, as illustrated in FIG. 5B.

At operation 518, the client machine 108 receives and displays the electronic user interface (e.g., second electronic user interface) on the client machine 108. For example, the client machine 108 displays the user interface 480, as illustrated in FIG. 5B. At operation 522, the client machine 108 receives a selection (e.g., third selection) and communicates a request (third request) over a network(s) to the backup machine 106. For example, the request may include a selection identifying a set of user interface elements representing a recovery point identifier (e.g., first recovery point identifier) corresponding to a snapshot image 118 including the software vulnerability for the virtual machine 114. In one embodiment, the user interface elements representing recovery point identifiers may be selected from the user interface 480, as illustrated, on FIG. 5B.

At operation 524, the processing module 122 receives the request (third request) from over the network(s). For example, the request may include the selection (e.g., recovery point identifier) corresponding to a snapshot image 118 for mounting. At operation 526, the processing module 122 mounts the snapshot image 118 based on the request (e.g., third request). For example, the processing module 122 mounts the snapshot image 118 by loading the snapshot image (e.g., first snapshot image) from the database 107 into the memory on the backup machine 106. Loading the snapshot image 118 into the memory of the backup machine 106 facilitates a forensic analysis of the software vulnerability in the virtual machine 114.

Figure 5B:
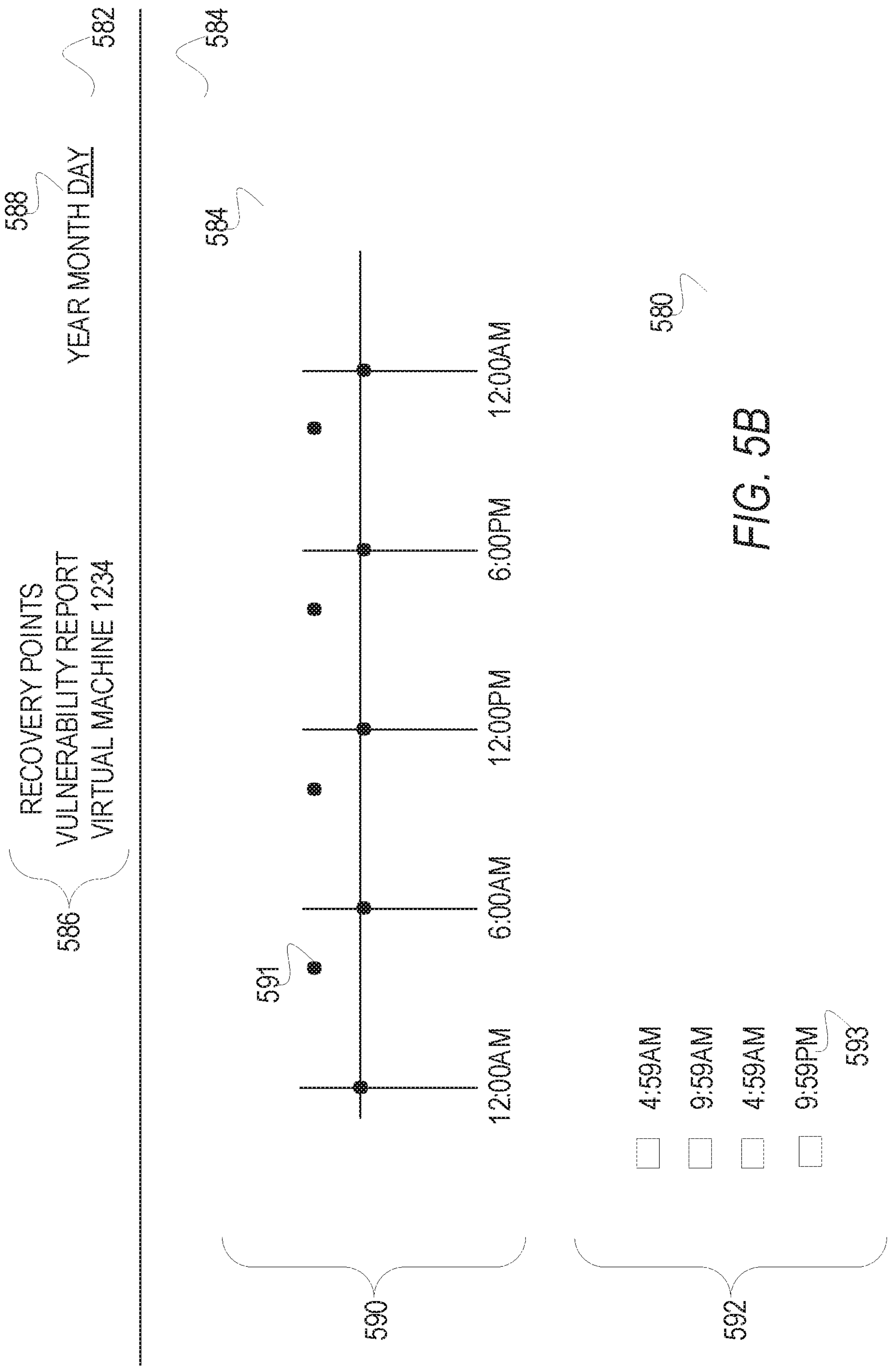
FIG. 5B is a block diagram illustrating an electronic user interface, according to an embodiment, for presentation of recovery point identifiers for a virtual machine.

FIG. 5B is a diagram illustrating an electronic user interface 580, according to an embodiment, for presentation of recovery point identifiers for a virtual machine 114. The electronic user interface 580 (second electronic user interface) may be presented, by the processing module 122, over a network (e.g., network 109, networks included in the networked system 102, and the like) to the client machine 108. The electronic user interface 580 may be presented, by the processing module 122, responsive to the selection of a user interface element or set of user interface elements representing a software vulnerability on a virtual machine 114. For example, the electronic user interface 580 may be presented responsive to the selection (second selection) of a user interface element representing a software vulnerability as illustrated in FIG. 4A or FIG. 4B, as previously described.

The electronic user interface 580 may include a top panel 582 and a body panel 584. The top panel 582 may include a title 586 and a time control 588. For example, the title 586 may be embodied as "RECOVERY POINTS" "VULNERABILITY REPORT" for "VIRTUAL MACHINE 1234." The time control 588 includes selectable user interface elements for selecting a "YEAR" view, a "MONTH" view, and "DAY" view. FIG. 5B illustrates the time control 588 with "DAY" (underlined) because the "DAY" view is being illustrated. The time control 588 enables telescoping down to the desired day to select a recovery point identifier from a "DAY" view. For example, the "YEAR" view is the highest level view and enables a presentation of a "MONTH" view responsive to a selection from the "YEAR" view. The "MONTH" view is the mid-level view and enables a presentation of a "DAY" view responsive to a selection from the "MONTH" view. The "YEAR" view may be initially presented on the client machine 108 responsive to identifying the software vulnerability in more than one year-month (e.g., 2018-January) and enables the selection of a single year-month (e.g., 2018-January) from a group of year-months. Likewise, the "MONTH" view may be initially presented on the client machine 108 responsive to identifying the software vulnerability in a single month and enables the selection of a single day (e.g., Jan. 12, 2018) from a month (e.g., January) of days. Likewise, the "DAY" view may be initially presented on the client machine 108 responsive to identifying the software vulnerability for the virtual machine 114 being in a single day (e.g., Jan. 12, 2018). The "DAY" view enables the selection of a recovery point identifier at a time during the day. Selection of the recovery point identifier causes the corresponding snapshot image 118 to be mounted (loaded into memory) for a forensic analysis. For example, the snapshot image 118 for "4:59 AM" is mounted responsive to the selection of the user interface elements signifying the snapshot image 118 at 4:59 AM.

The body panel 584 includes a user interface elements 590 presenting recovery point identifiers in a graphic form and user interface elements 592 presenting recovery point identifiers in list form. The user interface elements 590 include the graphic form "." at time "4:59 AM," the graphic form "." at time "9:59 AM," the graphic form "." at time "4:59 PM" and the graphic form "." at time "9:59 PM." For example, the user interface element 591 "." at time "4:59 AM" may be selected to mount a snapshot image 118 taken at "4:59 AM." Likewise, the user interface elements 592 include the list form "4:59 AM," the list form "9:59 AM," the list form "4:59 PM," and the list form "9:59 PM." For example, the user interface element 593 may be selected to mount a snapshot image 118 taken at "9:59 AM."

Figure 6A:
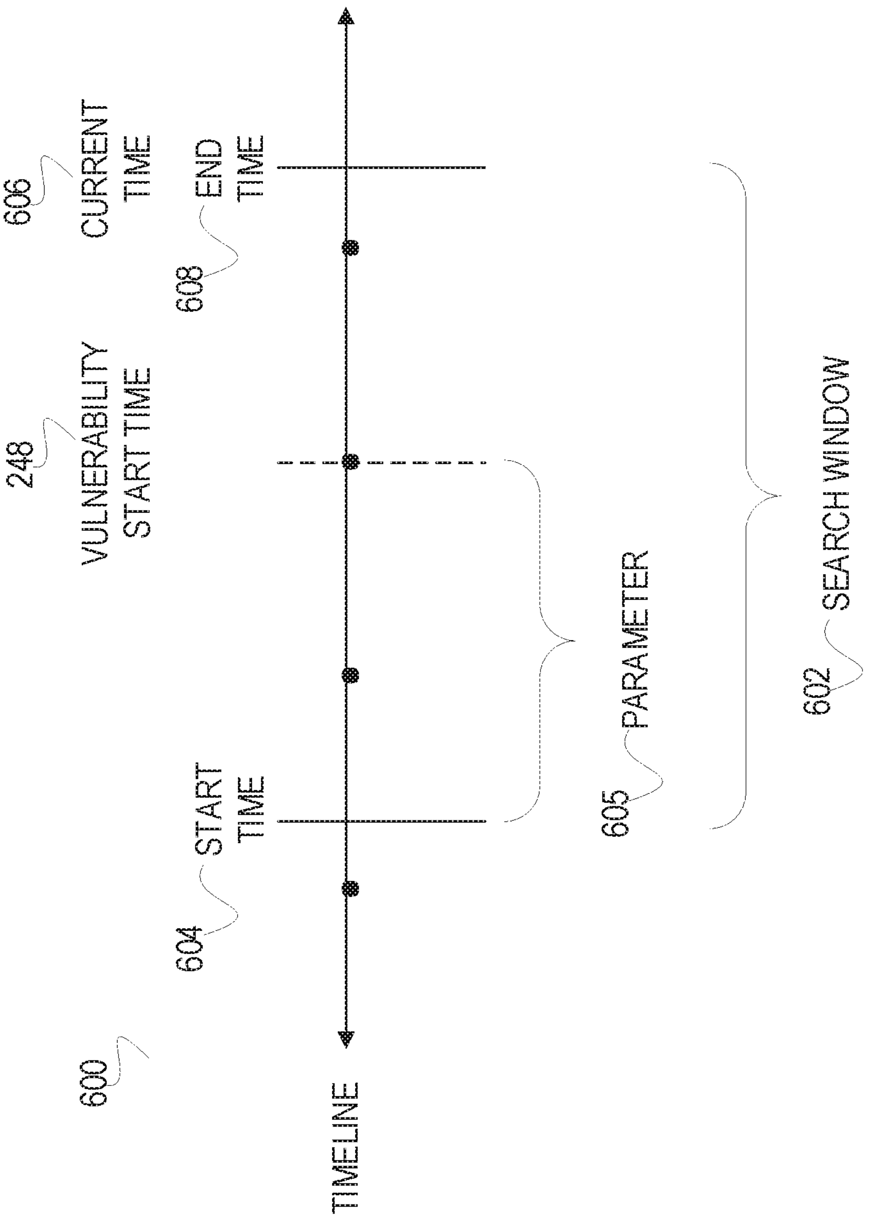
FIG. 6A is a diagram illustrating a timeline, according to an embodiment.

FIG. 6A is a diagram illustrating a timeline 600, according to an embodiment, to identify snapshot images 118 (e.g., set of snapshot images 118) to search for the software vulnerability. Consider the backup machine 106 receiving a message indicating a new software vulnerability. Here, a technical problem arises. How far back in time should snapshot images 118 that are periodically stored (e.g., archive event 261) in a database (e.g., database 107) with a timestamp (e.g., archive event timestamp 264) be searched to identify the software vulnerability?

The technical solution to the technical problem is to establish a search window 602 that is based on configurable and meaningful values. The search window 602 may include a start time 604 and an end time 608. The start time 604 may be computed by subtracting a parameter 605 from a vulnerability start time 604. For example, the vulnerability start time 604 may be the vulnerability start timestamp 248 (e.g., time registering public knowledge of the software vulnerability). In one embodiment, the parameter 605 may be configurable. The end time 608 may be the current time 606. For example, the end time 608 may be continuously updated by a clock that dynamically provides the current time 606. Accordingly, a search window 602 that is sliding is identified for identification of a set of snapshot images 118, each associated with a timestamp (e.g., e.g., archive event timestamp 264), for searching whether virtual machines 114 within the snapshot images 118 includes the software vulnerability.

Figure 6B:
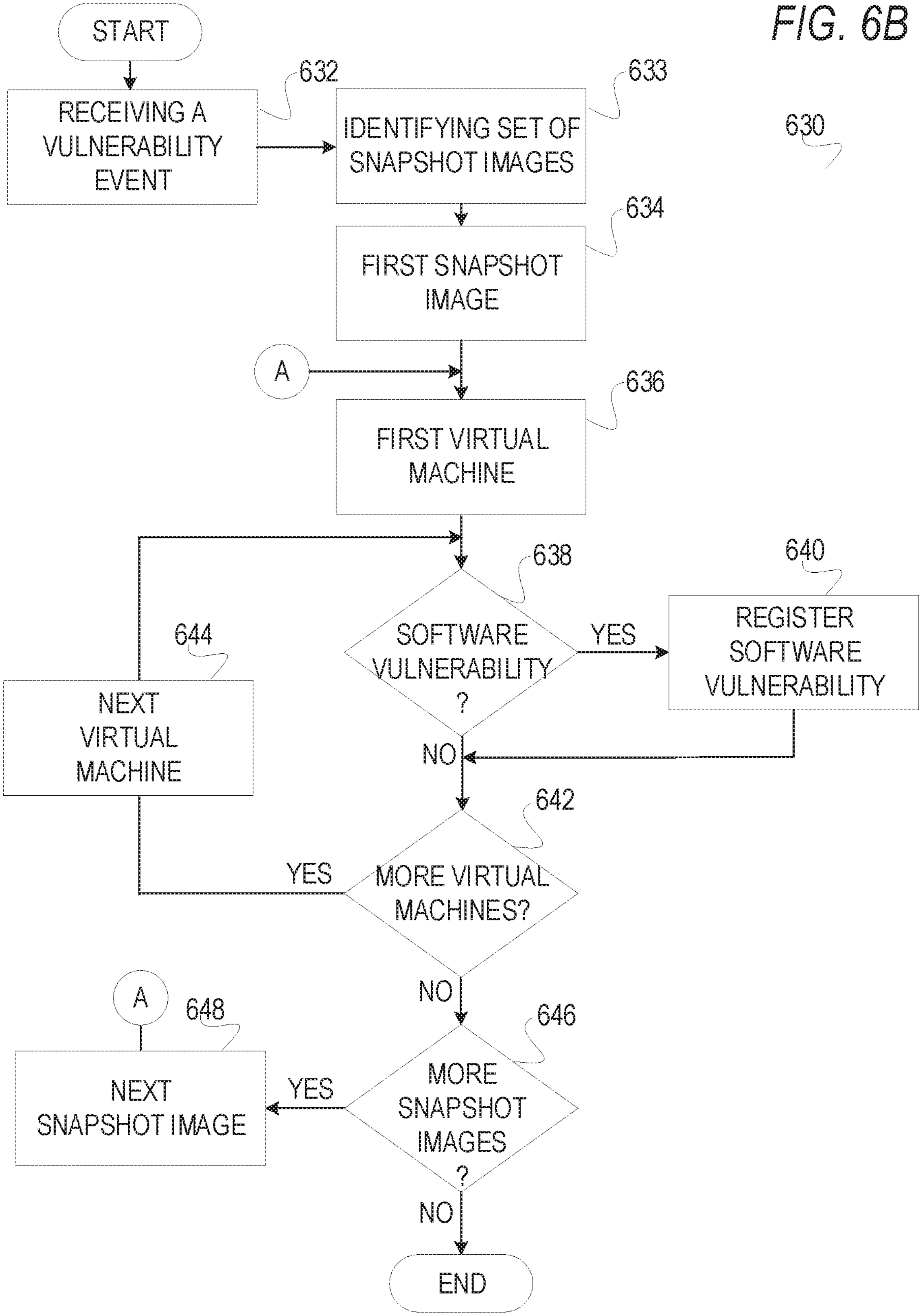
FIG. 6B is a block diagram illustrating a method, according to an embodiment, to identify a software vulnerability in snapshot images.

FIG. 6B is a block diagram illustrating a method 630, according to an embodiment, to identify a software vulnerability in snapshot images 118 of the production machine 104 responsive to a notification of a new software vulnerability. The method 630 is preformed on the backup machine 106. The method 630 commences at operation 632 with the receiving module 120 receiving a message identifying a new software vulnerability. For example, the new software vulnerability may be communicated to the backup machine 106 over a network (e.g., networks included in the networked system 102 and network 109) with a message (e.g., electronic message). In one embodiment, the message may include patch information for remediating the software vulnerability, a vulnerability identifier 240, criterion information 246 and a vulnerability start timestamp 248, as previously described. For example, the message may include the vulnerability event 224.

At operation 633, the processing module 122 identifies a set of snapshot images 118. For example, the processing module 122 may identify the set of snapshot images 1118 as described in association with the timeline 600 illustrated in FIG. 6A. Recall that the processing module 122 may subtract parameter 605 (e.g., 365 days) from a timestamp (e.g., Jan. 1, 2019, 2 AM) included in the message (e.g., vulnerability start timestamp 248) to define the start time 604 (e.g., Jan. 1, 2018, 2 AM) of the search window 602. In addition, the processing module 122 may utilize a clock to obtain a current time 606 continuously updated in real-time to define the end time 608 of the search window 602.

At operation 634, the processing module 122 initializes a current snapshot image with the first snapshot image 118 (e.g., earliest chronologically). The current snapshot image tracks the snapshot image 118 being processed. For example, the processing module 122 may identify the first snapshot image 118 based on the search window 602, as previously described, and store the first snapshot image 118 in the current snapshot image. In one embodiment, the processing module 122 may initialize the current snapshot image to the first snapshot image 118 by identifying the earliest snapshot image 118 (e.g., archive event 261) (e.g., archive event timestamp 264) in the database 107 that is equal to or greater than the start time 604 of the search window 602.

At operation 636, the processing module 122 initializes a virtual machine counter to a first virtual machine 114. For example, the processing module 122 may initialize the virtual machine counter to a first virtual machine 114 that is found in the snapshot image 118 identified by the snapshot image counter. In one embodiment, the first virtual machine 114 in the snapshot image 118 may be the first virtual machine 114 in hypervisor information 110.

At decision operation 638, the processing module 122 identifies whether the virtual machine 114, identified by the virtual machine counter, includes the software vulnerability. For example, the processing module 122 may identify whether the virtual machine 114 includes the software vulnerability by performing operations substantially similar to operation 356 and decision operation 358 in FIG. 3B, as previously described. If the virtual machine 114, identified by the virtual machine counter, includes the software vulnerability, then a branch is made to operation 640. Otherwise, a branch is made to decision operation 642.

At operation 640, the processing module 122 registers the software vulnerability. For example, the processing module 122 may register the software vulnerability by storing a software vulnerability identifier, identifying the software vulnerability, in association with the current virtual machine 114 and the current snapshot image 118 in the archive event 261. The operation 640 is further described in method 660 in association with FIG. 6C. At decision operation 642, the processing module 122 identifies whether more virtual machines 114 are present in the snapshot image 118. If more virtual machines 114 are present in the snapshot image 118, then a branch is made to operation 644. Otherwise a branch is made to decision operation 646.

At decision operation 646, the processing module 122 identifies whether more snapshot images 118 are present in the set of snapshot images identified in operation 633. If more snapshot images 118 are present, then a branch is made to operation 648. At operation 644, the processing module 122 advances to the next virtual machine 614 in the snapshot image 118. At operation 648, the processing module 122 advances to the next snapshot image 118 in the production machine 104. In one embodiment, the production machine 104 may include multiple elements of hypervisor information 110. In this embodiment the search window 602 is applied to each element of hypervisor information 110.

Figure 6C:
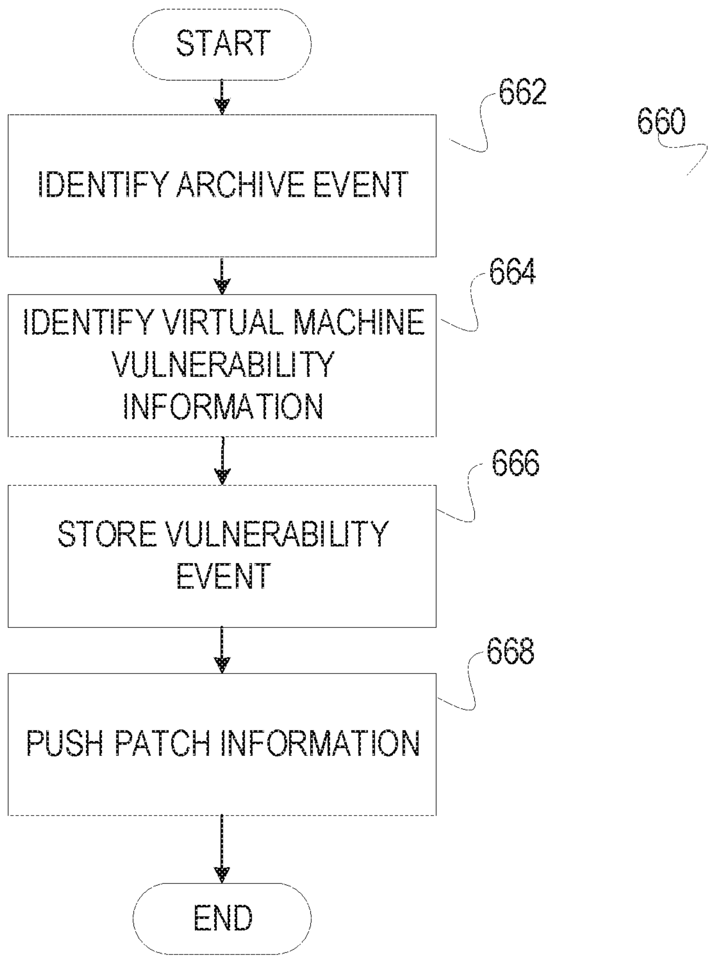
FIG. 6C is a block diagram illustrating a method, according to an embodiment, to register a software vulnerability.

FIG. 6C is a block diagram illustrating a method 660, according to an embodiment, to register a software vulnerability. The method 660 further describes the operation 640 on FIG. 6B. At operation 662, the processing module 122 identifies the archive event 261 in the archive information 128 corresponding to the current snapshot image. For example, the processing module 122 may identify the archive event 261 based on matching snapshot image identifiers (e.g., recovery point identifiers 266). If for example, the recovery point identifier 266 in the archive event 261 matches the recovery point identifier 266 for the current snapshot image 118 then processing module 122 identifies the archive event 261.

At operation 664, the processing module 122 identifies the virtual machine vulnerability information 260 in the archive event 261 corresponding to the current virtual machine 114. For example, the processing module 122 may identify the virtual machine vulnerability information 260 based on matching virtual machine identifiers (e.g., vulnerability identifier 240). If a match is not found, then the processing module 122 creates a virtual machine vulnerability information 260 element based on the current virtual machine 114, stores the virtual machine vulnerability information 260 element in the archive event 261, and stores the virtual machine identifier for the current virtual machine 114 in the virtual machine vulnerability information 260.

At operation 666, the processing module 122 registers the software vulnerability to the snapshot image 118. For example, the processing module 122 may register the software vulnerability by storing the new software vulnerability (e.g., vulnerability event 224) in the virtual machine vulnerability information 260 (corresponding to the current virtual machine 114) in the archive event 261 (corresponding to the current snapshot image 118) in the archive information 128.

At operation 668, the processing module 122 patches the production machine 104 based on the new software vulnerability. For example, the new software vulnerability (e.g., vulnerability event 224) may include a means for remediation of the new software vulnerability (e.g., patch information 230). If the new software vulnerability (e.g., vulnerability event 224) include the means for remediating the new software vulnerability (e.g., patch information 230) then the processing module 122 patches the virtual machine 114 on the production machine 104. In one embodiment, the processing module may push the patch information 230 to the production machine 104. In another example, the processing module 122 may cause the patching of the production machine 104 by communicating a request to retrieve a snapshot image 118, as illustrated operation 399 on FIG. 3D.

Figure 7A:
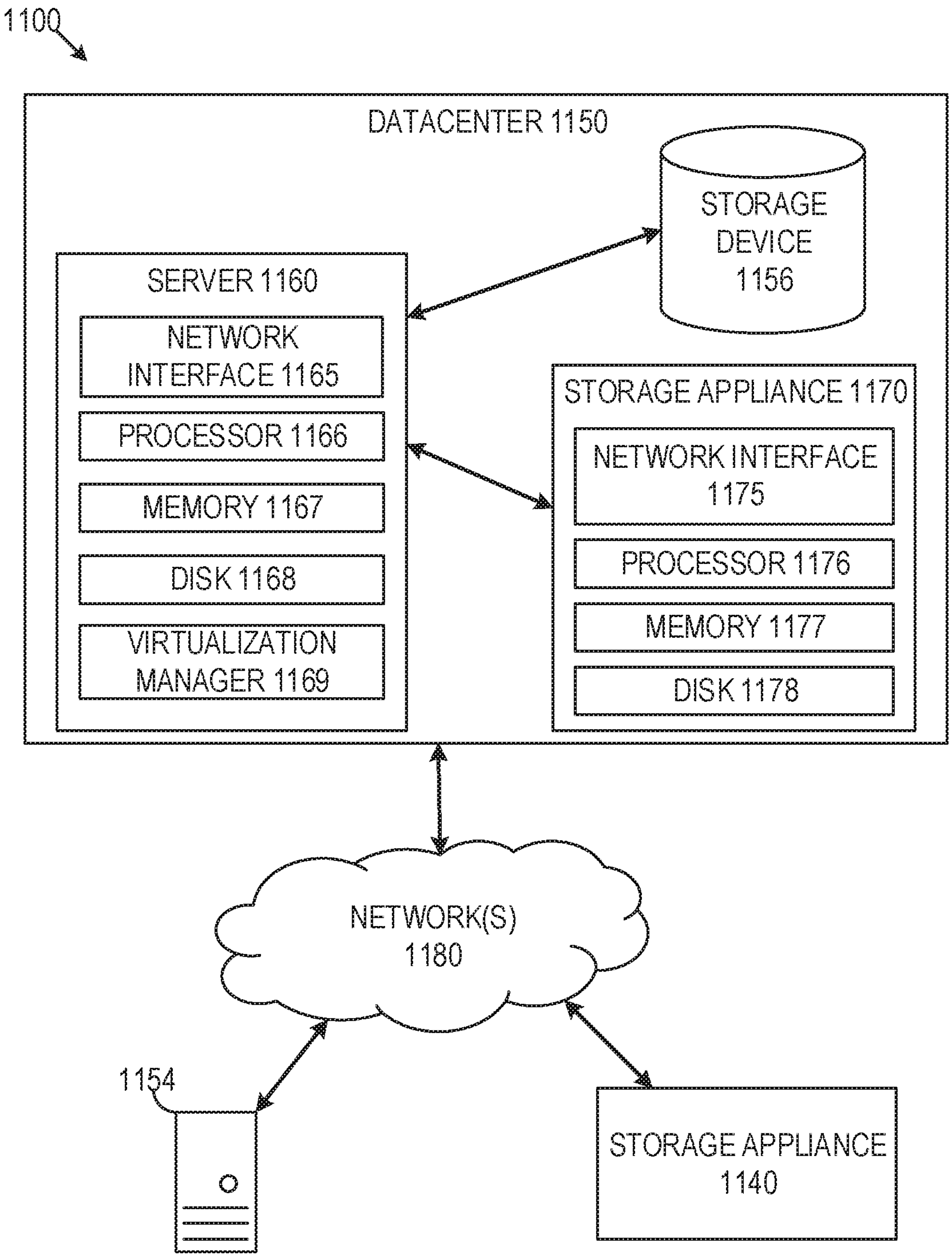
FIG. 7A is a block diagram illustrating a networked computing environment, according to an embodiment.

FIG. 7A depicts one embodiment of a networked computing environment 1100 in which the disclosed technology may be practiced. As depicted, the networked computing environment 1100 includes a data center 1150, a storage appliance 1140, and a computing device 1154 in communication with each other via one or more networks 1180. The networked computing environment 1100 may include a plurality of computing devices interconnected through one or more networks 1180. The one or more networks 1180 may allow computing devices and/or storage devices to connect to and communicate with other computing devices and/or other storage devices. In some cases, the networked computing environment 1100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The data center 1150 may include one or more servers, such as server 1160, in communication with one or more storage devices, such as storage device 1156. The one or more servers may also be in communication with one or more storage appliances, such as storage appliance 1170. The server 1160, storage device 1156, and storage appliance 1170 may be in communication with each other via a networking fabric connecting servers and data storage units within the data center 1150 to each other. The storage appliance 1170 may include a data management system for backing up virtual machines and/or files within a virtualized infrastructure. The server 1160 may be used to create and manage one or more virtual machines associated with a virtualized infrastructure.

The one or more virtual machines may run various applications, such as a database application or a web server. The storage device 1156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 1150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 1180 may include a secure network such as an enterprise private network, an unsecure network such as a wireless open network, a local area network (LAN), a wide area network (WAN), and the Internet. The one or more networks 1180 may include a cellular network, a mobile network, a wireless network, or a wired network. Each network of the one or more networks 1180 may include hubs, bridges, routers, switches, and wired transmission media such as a direct-wired connection. The one or more networks 1180 may include an extranet or other private network for securely sharing information or providing controlled access to applications or files.

A server, such as server 1160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 1160 includes a network interface 1165, processor 1166, memory 1167, disk 1168, and virtualization manager 1169 all in communication with each other. Network interface 1165 allows server 1160 to connect to one or more networks 1180. Network interface 1165 may include a wireless network interface and/or a wired network interface. Processor 1166 allows server 1160 to execute computer-readable instructions stored in memory 1167 in order to perform processes described herein. Processor 1166 may include one or more processing units, such as one or more CPUs and/or one or more GPUs. Memory 1167 may comprise one or more types of memory (e.g., RAM, SRAM, DRAM, ROM, EEPROM, Flash, etc.). Disk 1168 may include a hard disk drive and/or a solid-state drive. Memory 1167 and disk 1168 may comprise hardware storage devices.

The virtualization manager 1169 may manage a virtualized infrastructure and perform management operations associated with the virtualized infrastructure. The virtualization manager 1169 may manage the provisioning of virtual machines running within the virtualized infrastructure and provide an interface to computing devices interacting with the virtualized infrastructure. In one example, the virtualization manager 1169 may set a virtual machine into a frozen state in response to a snapshot request made via an application programming interface (API) by a storage appliance, such as storage appliance 1170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 1169 may then transfer data associated with the virtual machine (e.g., an image of the virtual machine or a portion of the image of the virtual disk file associated with the state of the virtual disk at the point in time from which it is frozen) to a storage appliance in response to a request made by the storage appliance. After the data associated with the point-in-time snapshot of the virtual machine has been transferred to the storage appliance 1170, the virtual machine may be released from the frozen state (i.e., unfrozen) and the updates made to the virtual machine and stored in the separate file may be merged into the virtual disk file. The virtualization manager 1169 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 1170 includes a network interface 1175, processor 1176, memory 1177, and disk 1178 all in communication with each other. Network interface 1175 allows storage appliance 1170 to connect to one or more networks 1180. Network interface 1175 may include a wireless network interface and/or a wired network interface. Processor 1176 allows storage appliance 1170 to execute instructions stored in memory 1177 in order to perform processes described herein. Processor 1176 may include one or more processing units, such as one or more CPUs and/or one or more GPUs. Memory 1177 may comprise one or more types of memory (e.g., RAM, SRAM, DRAM, ROM, EEPROM, NOR Flash, NAND Flash, etc.). Disk 1178 may include a hard disk drive and/or a solid-state drive. Memory 1177 and disk 1178 may comprise hardware storage devices.

In one embodiment, the storage appliance 1170 may include four machines. Each of the four machines may include a multi-core CPU, 64 GB of RAM, a 400 GB SSD, three 4 TB HDDs, and a network interface controller. In this case, the four machines may be in communication with the one or more networks 1180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of a thousand virtual machines. The networked computing environment 1100 may provide a cloud computing environment for one or more computing devices. Cloud computing may refer to Internet-based computing, wherein shared resources, software, and/or information may be provided to one or more computing devices on-demand via the Internet. The networked computing environment 1100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 1100 may include a virtualized infrastructure that provides software, data processing, and/or data storage services to end users accessing the services via the networked computing environment 1100. In one example, networked computing environment 1100 may provide cloud-based work productivity or business-related applications to a computing device, such as computing device 1154. The storage appliance 1140 may comprise a cloud-based data management system for backing up virtual machines and/or files within a virtualized infrastructure, such as virtual machines running on server 1160 or files stored on server 1160.

In some cases, networked computing environment 1100 may provide remote access to secure applications and files stored within data center 1150 from a remote computing device, such as computing device 1154. The data center 1150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 1154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 1170 may manage the extraction and storage of virtual machine snapshots associated with different point-in-time versions of one or more virtual machines running within the data center 1150. A snapshot of a virtual machine may correspond with a state of the virtual machine at a particular point in time. In response to a restore command from the server 1160, the storage appliance 1170 may restore a point-in-time version of a virtual machine or restore point-in-time versions of one or more files located on the virtual machine and transmit the restored data to the server 1160. In response to a mount command from the server 1160, the storage appliance 1170 may allow a point-in-time version of a virtual machine to be mounted and allow the server 1160 to read and/or modify data associated with the point-in-time version of the virtual machine. To improve storage density, the storage appliance 1170 may deduplicate and compress data associated with different versions of a virtual machine and/or deduplicate and compress data associated with different virtual machines. To improve system performance, the storage appliance 1170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 1170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 1170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 1170 may run a Network File System (NFS) server and make the particular version (or a copy of the particular version) of the virtual machine accessible for reading and/or writing. The end user of the storage appliance 1170 may then select the particular version to be mounted and run an application (e.g., a data analytics application) using the mounted version of the virtual machine. In another example, the particular version may be mounted as an iSCSI target.

Figure 7B:
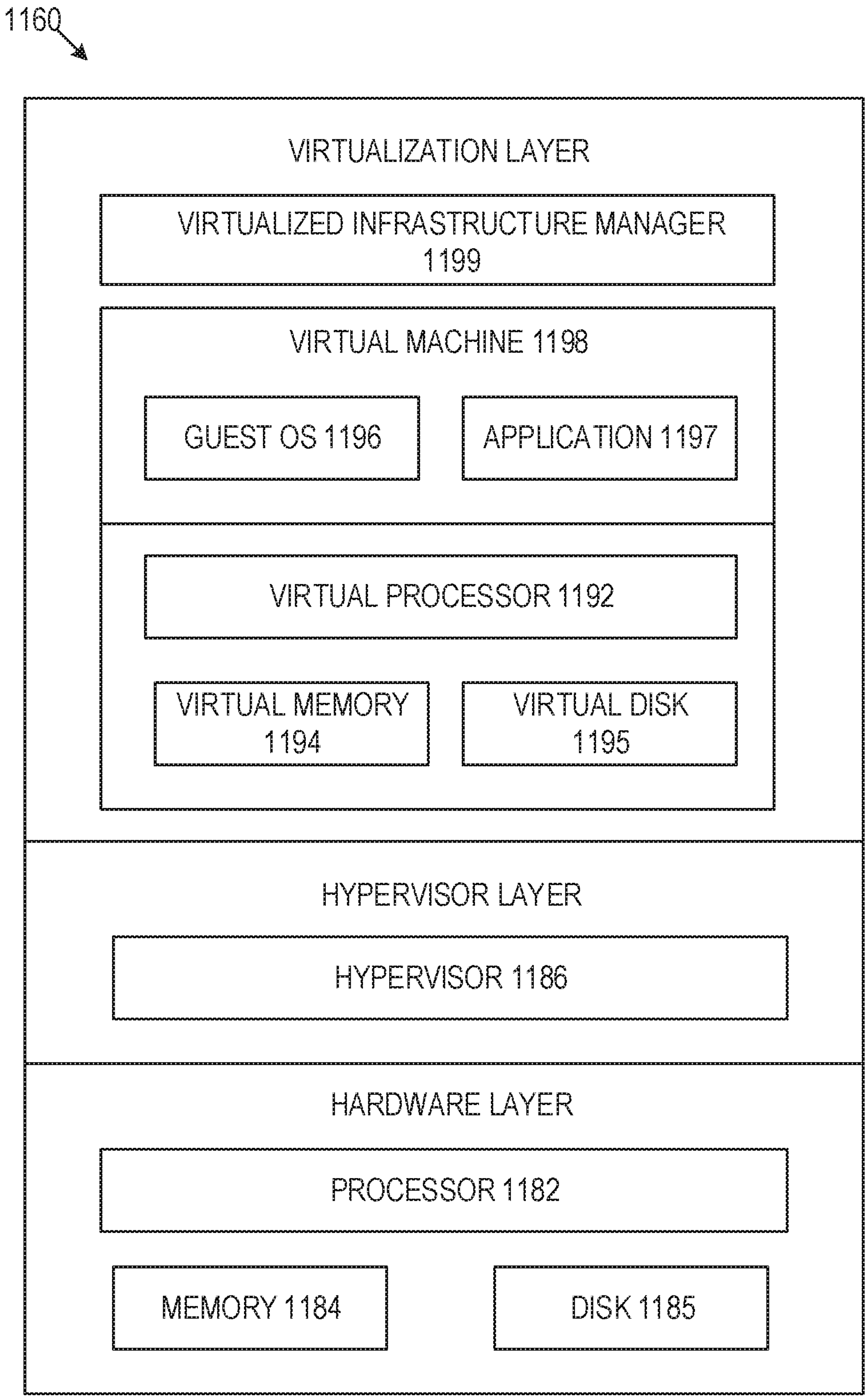
FIG. 7B is a block diagram illustrating a server, according to an embodiment.

FIG. 7B depicts one embodiment of server 1160 in FIG. 7A. The server 1160 may comprise one server out of a plurality of servers that are networked together within a data center (e.g., data center 1150). In one example, the plurality of servers may be positioned within one or more server racks within the data center. As depicted, the server 1160 includes hardware-level components and software-level components. The hardware-level components include one or more processors 1182, one or more memory 1184, and one or more disks 1185. The software-level components include a hypervisor 1186, a virtualized infrastructure manager 1199, and one or more virtual machines, such as virtual machine 1198. The hypervisor 1186 may comprise a native hypervisor or a hosted hypervisor. The hypervisor 1186 may provide a virtual operating platform for running one or more virtual machines, such as virtual machine 1198. Virtual machine 1198 includes a plurality of virtual hardware devices including a virtual processor 1192, a virtual memory 1194, and a virtual disk 1195. The virtual disk 1195 may comprise a file stored within the one or more disks 1185. In one example, a virtual machine 1198 may include a plurality of virtual disks, with each virtual disk of the plurality of virtual disks associated with a different file stored on the one or more disks 1185. Virtual machine 1198 may include a guest operating system 1196 that runs one or more applications, such as application 1197.

The virtualized infrastructure manager 1199, which may correspond with the virtualization manager 1169 in FIG. 7A, may run on a virtual machine or natively on the server 1160. The virtualized infrastructure manager 1199 may provide a centralized platform for managing a virtualized infrastructure that includes a plurality of virtual machines. The virtualized infrastructure manager 1199 may manage the provisioning of virtual machines running within the virtualized infrastructure and provide an interface to computing devices interacting with the virtualized infrastructure. The virtualized infrastructure manager 1199 may perform various virtualized infrastructure related tasks, such as cloning virtual machines, creating new virtual machines, monitoring the state of virtual machines, and facilitating backups of virtual machines.

In one embodiment, the server 1160 may use the virtualized infrastructure manager 1199 to facilitate backups for a plurality of virtual machines (e.g., eight different virtual machines) running on the server 1160. Each virtual machine running on the server 1160 may run its own guest operating system and its own set of applications. Each virtual machine running on the server 1160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 1140 in FIG. 7A or storage appliance 1170 in FIG. 7A, may request a snapshot of a virtual machine running on the server 1160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 1199 may set the virtual machine into a frozen state or store a copy of the virtual machine at the particular point in time. The virtualized infrastructure manager 1199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 1199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 1199 may transfer a portion of an image of the virtual machine associated with data that has changed since an earlier point in time prior to the particular point in time or since a last snapshot of the virtual machine was taken. In one example, the virtualized infrastructure manager 1199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 1199 may output one or more virtual data blocks associated with the virtual machine that have been modified between the first point in time and the second point in time.

In some embodiments, the server 1160 or the hypervisor 1186 may communicate with a storage appliance, such as storage appliance 1140 in FIG. 7A or storage appliance 1170 in FIG. 7A, using a distributed file system protocol such as Network File System (NFS) Version 3. The distributed file system protocol may allow the server 1160 or the hypervisor 1186 to access, read, write, or modify files stored on the storage appliance 1140/1170 as if the files were locally stored on the server 1160. The distributed file system protocol may allow the server 1160 or the hypervisor 1186 to mount a directory or a portion of a file system located within the storage appliance 1140/1170.

Figure 7C:
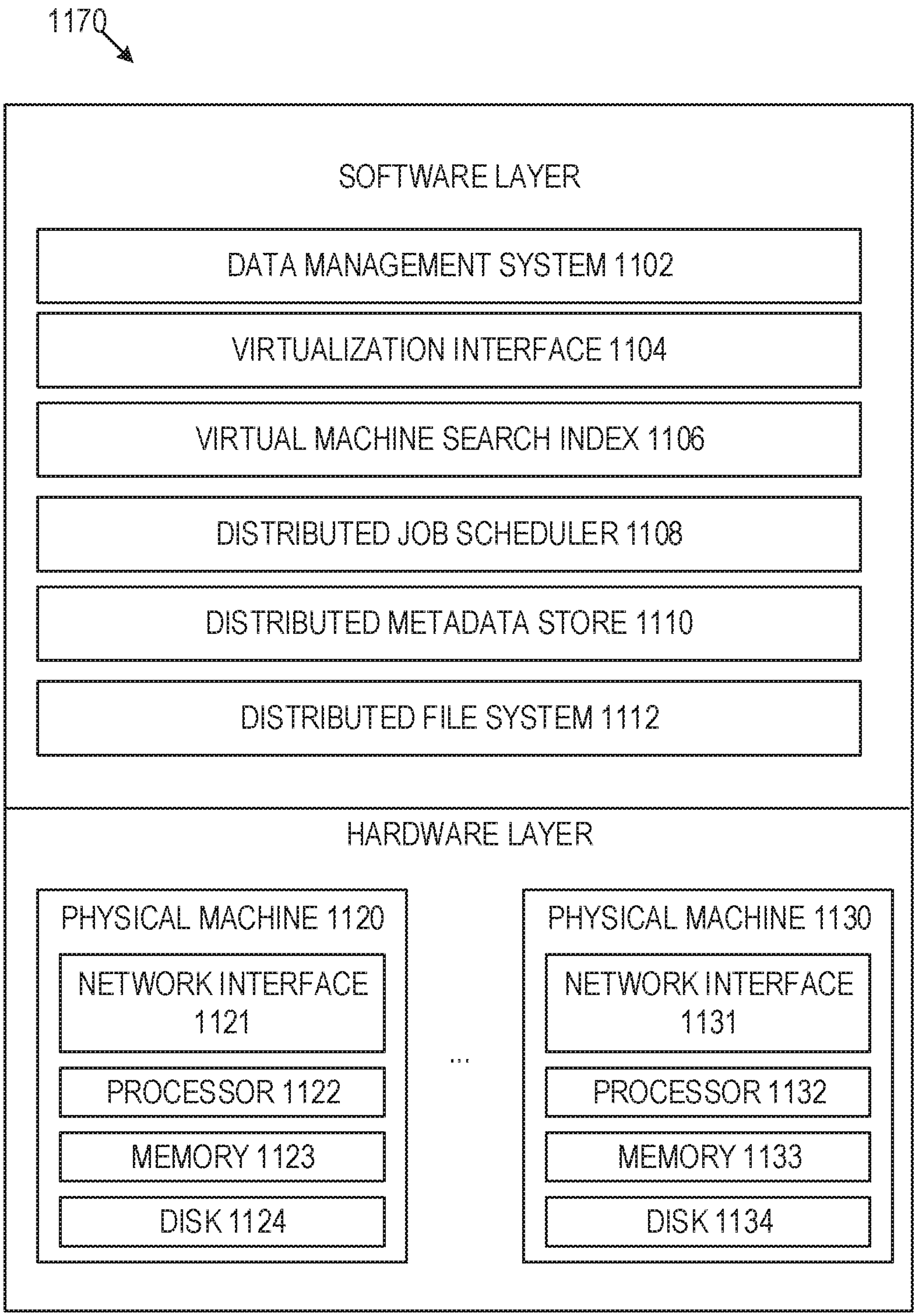
FIG. 7C is a block diagram illustrating a server storage platform, according to an embodiment.

FIG. 7C depicts one embodiment of storage appliance 1170 (e.g., server storage platform) in FIG. 7A. The storage appliance 1170 may include a plurality of physical machines that may be grouped together and presented as a single computing system. Each physical machine of the plurality of physical machines may comprise a node in a cluster (e.g., a failover cluster). In one example, the storage appliance 1170 may be positioned within a server rack within a data center. As depicted, the storage appliance 1170 includes hardware-level components and software-level components. The hardware-level components include one or more physical machines, such as physical machine 1120 and physical machine 1130. The physical machine 1120 includes a network interface 1121, processor 1122, memory 1123, and disk 1124 all in communication with each other. Processor 1122 allows physical machine 1120 to execute computer-readable instructions stored in memory 1123 to perform processes described herein. Disk 1124 may include a hard disk drive and/or a solid-state drive. The physical machine 1130 includes a network interface 1131, processor 1132, memory 1133, and disk 1134 all in communication with each other. Processor 1132 allows physical machine 1130 to execute computer-readable instructions stored in memory 1133 to perform processes described herein. Disk 1134 may include a hard disk drive and/or a solid-state drive. In some cases, disk 1134 may include a flash-based SSD or a hybrid HDD/SSD drive. In one embodiment, the storage appliance 1170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 1160 in FIG. 7A, or a hypervisor, such as hypervisor 1186 in FIG. 7B, to communicate with the storage appliance 1170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 1186 in FIG. 7B, may be configured with a first floating IP address associated with a first node in the cluster. The hypervisor may connect to the cluster using the first floating IP address. In one example, the hypervisor may communicate with the cluster using the NFS Version 3 protocol.

Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node (0) to node (N−1), for a floating IP address (i), the VRRP priority of nodeG) may be G−i) modulo N. In another example, given a number (N) of nodes in a cluster from node (0) to node (N−1), for a floating IP address (i), the VRRP priority of nodeG) may be (i−j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 7C, the software-level components of the storage appliance 1170 may include data management system 1102, a virtualization interface 1104, a distributed job scheduler 1108, a distributed metadata store 1110, a distributed file system 1112, and one or more virtual machine search indexes, such as virtual machine search index 1106. In one embodiment, the software-level components of the storage appliance 1170 may be run using a dedicated hardware-based appliance. In another embodiment, the software-level components of the storage appliance 1170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 1170 may be created (e.g., the directory for Virtual Machine A may be /snapshots/VM_A).

Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/sl/and a second snapshot of Virtual Machine A may reside in /snapshots/VM_A/s2/).

The distributed file system 1112 may present itself as a single file system, in which as new physical machines or nodes are added to the storage appliance 1170, the cluster may automatically discover the additional nodes and automatically increase the available capacity of the file system for storing files and other data. Each file stored in the distributed file system 1112 may be partitioned into one or more chunks or shards. Each of the one or more chunks may be stored within the distributed file system 1112 as a separate file. The files stored within the distributed file system 1112 may be replicated or mirrored over a plurality of physical machines, thereby creating a load-balanced and fault-tolerant distributed file system. In one example, storage appliance 1170 may include ten physical machines arranged as a failover cluster and a first file corresponding with a snapshot of a virtual machine (e.g., /snapshots/VM_A/sl/sl.full) may be replicated and stored on three of the ten machines.

The distributed metadata store 1110 may include a distributed database management system that provides high availability without a single point of failure. In one embodiment, the distributed metadata store 1110 may comprise a database, such as a distributed document-oriented database. The distributed metadata store 1110 may be used as a distributed key value storage system. In one example, the distributed metadata store 1110 may comprise a distributed NoSQL key value store database. In some cases, the distributed metadata store 1110 may include a partitioned row store, in which rows are organized into tables or other collections of related data held within a structured format within the key value store database. A table (or a set of tables) may be used to store metadata information associated with one or more files stored within the distributed file system 1112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 1112 and metadata associated with the new file may be stored within the distributed metadata store 1110. The distributed metadata store 1110 may also be used to store a backup schedule for the virtual machine and a list of snapshots for the virtual machine that are stored using the storage appliance 1170.

In some cases, the distributed metadata store 1110 may be used to manage one or more versions of a virtual machine. Each version of the virtual machine may correspond with a full image snapshot of the virtual machine stored within the distributed file system 1112 or an incremental snapshot of the virtual machine (e.g., a forward incremental or reverse incremental) stored within the distributed file system 1112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 1108 may be used for scheduling backup jobs that acquire and store virtual machine snapshots for one or more virtual machines over time. The distributed job scheduler 1108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 1108 may schedule a specific job to be run on a particular node based on data stored on the particular node. For example, the distributed job scheduler 1108 may schedule a virtual machine snapshot job to be run on a node in a cluster that is used to store snapshots of the virtual machine in order to reduce network congestion.

The distributed job scheduler 1108 may comprise a distributed fault-tolerant job scheduler, in which jobs affected by node failures are recovered and rescheduled to be run on available nodes. In one embodiment, the distributed job scheduler 1108 may be fully decentralized and implemented without the existence of a master node. The distributed job scheduler 1108 may run job scheduling processes on each node in a cluster or on a plurality of nodes in the cluster. In one example, the distributed job scheduler 1108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 1110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 1108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 1108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 1108 may ensure that each task of the series of tasks is executed based on the ordering of tasks. Tasks that do not have dependencies with each other may be executed in parallel.

In some cases, the distributed job scheduler 1108 may schedule each task of a series of tasks to be performed on a specific node in a cluster. In other cases, the distributed job scheduler 1108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 1108 may assign one or more tasks associated with a job to be executed on a particular node in a cluster based on the location of data required to be accessed by the one or more tasks.

In one embodiment, the distributed job scheduler 1108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 1199 in FIG. 7B, to create a frozen copy of the virtual machine and to transfer one or more chunks (or one or more files) associated with the frozen copy to a storage appliance, such as storage appliance 1170 in FIG. 7A. The one or more tasks may also include generating metadata for the one or more chunks, storing the metadata using the distributed metadata store 1110, storing the one or more chunks within the distributed file system 1112, and communicating with the virtualized infrastructure manager that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 1112 (e.g., the first chunk is located at /snapshotsNM_B/sl/sl.chunkl). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 1104 may provide an interface for communicating with a virtualized infrastructure manager managing a virtualization infrastructure, such as virtualized infrastructure manager 1199 in FIG. 7B, and requesting data associated with virtual machine snapshots from the virtualization infrastructure. The virtualization interface 1104 may communicate with the virtualized infrastructure manager using an API for accessing the virtualized infrastructure manager (e.g., to communicate a request for a snapshot of a virtual machine). In this case, storage appliance 1170 may request and receive data from a virtualized infrastructure without requiring agent software to be installed or running on virtual machines within the virtualized infrastructure. The virtualization interface 1104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 1106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 1106 may be used to identify a version of the virtual machine that includes a particular version of a file (e.g., a particular version of a database, a spreadsheet, or a word processing document). In some cases, each of the virtual machines that are backed up or protected using storage appliance 1170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 1112 in FIG. 7C. The data management system 1102 may comprise an application running on the storage appliance that manages and stores one or more snapshots of a virtual machine. In one example, the data management system 1102 may comprise a highest-level layer in an integrated software stack running on the storage appliance. The integrated software stack may include the data management system 1102, the virtualization interface 1104, the distributed job scheduler 1108, the distributed metadata store 1110, and the distributed file system 1112.

In some cases, the integrated software stack may run on other computing devices, such as a server or computing device 1154 in FIG. 7A. The data management system 1102 may use the virtualization interface 1104, the distributed job scheduler 1108, the distributed metadata store 1110, and the distributed file system 1112 to manage and store one or more snapshots of a virtual machine. Each snapshot of the virtual machine may correspond with a point-in-time version of the virtual machine. The data management system 1102 may generate and manage a list of versions for the virtual machine. Each version of the virtual machine may map to or reference one or more chunks and/or one or more files stored within the distributed file system 1112. Combined together, the one or more chunks and/or the one or more files stored within the distributed file system 1112 may comprise a full image of the version of the virtual machine.

The modules, methods, engines, applications, and so forth described in conjunction with FIGS. 1-5B are implemented in some embodiments in the context of multiple machines and associated software architectures. The sections below describe representative software architecture(s) and machine (e.g., hardware) architecture(s) that are suitable for use with the disclosed embodiment Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosure in different contexts from the disclosure contained herein.

Figure 8:
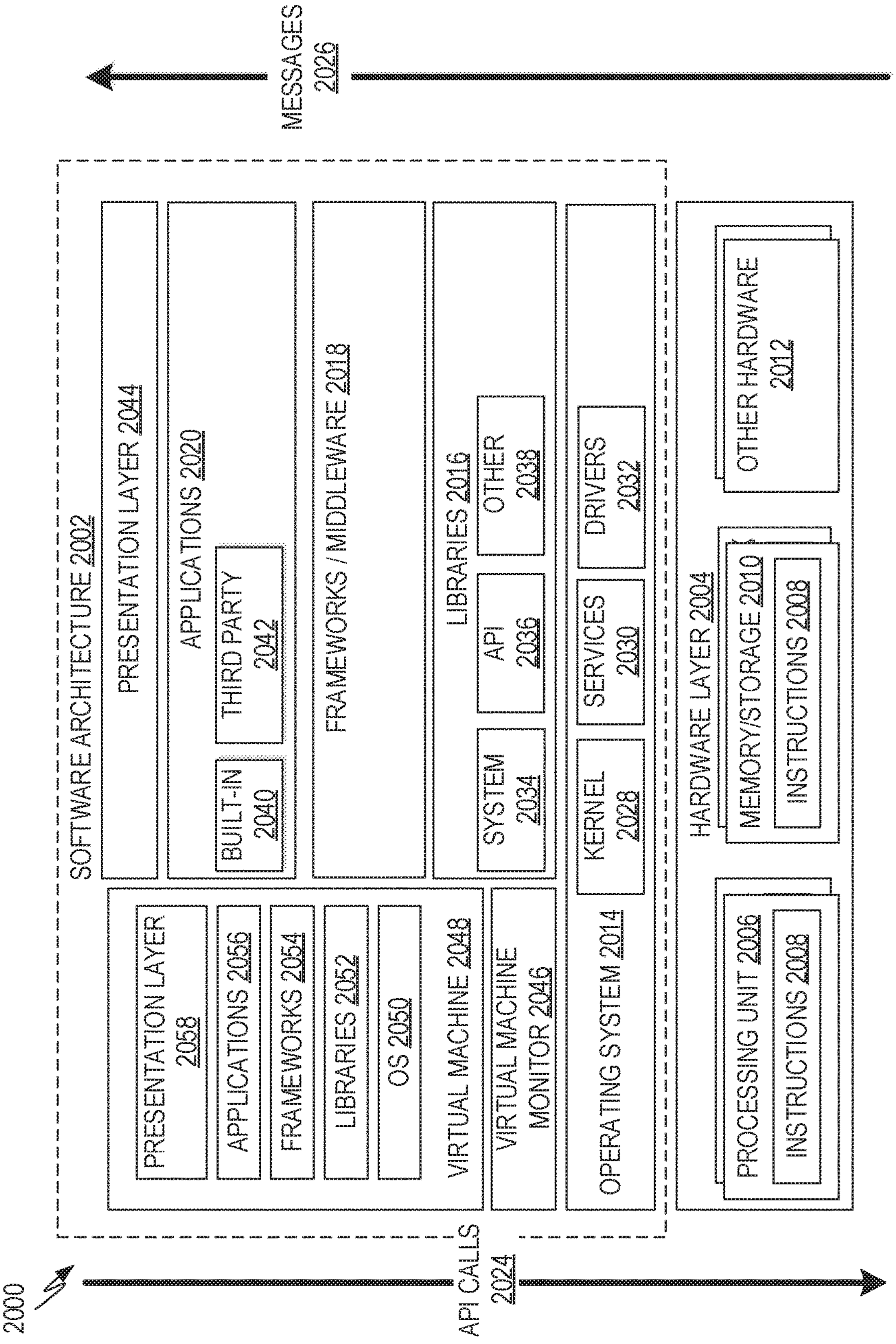
FIG. 8 is a block diagram illustrating a representative software architecture.

FIG. 8 is a block diagram 2000 illustrating a representative software architecture 2002, which may be used in conjunction with various hardware architectures herein described. FIG. 8 is merely a non-limiting example of a software architecture 2002, and it will be appreciated that many other architectures may be implemented to facilitate the functionality described herein. The software architecture 2002 may be executing on hardware such as a machine 2100 of FIG. 8 that includes, among other things, processors 2110, memory/storage 2130, and I/O components 2150. Returning to FIG. 8, a representative hardware layer 2004 is illustrated and can represent, for example, the machine 2100 of FIG. 9. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1-5B. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 8, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications as well as a broad assortment of other applications 2020. In a specific example, the third-party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third-party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 8, this is illustrated by a virtual machine 2048. The virtual machine 2048 creates a software environment where applications/modules can execute as if they were executing on a hardware machine (such as the machine 2100 of FIG. 9, for example). The virtual machine 2048 is hosted by a host operating system (e.g., operating system 2014 in FIG. 8) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 9:
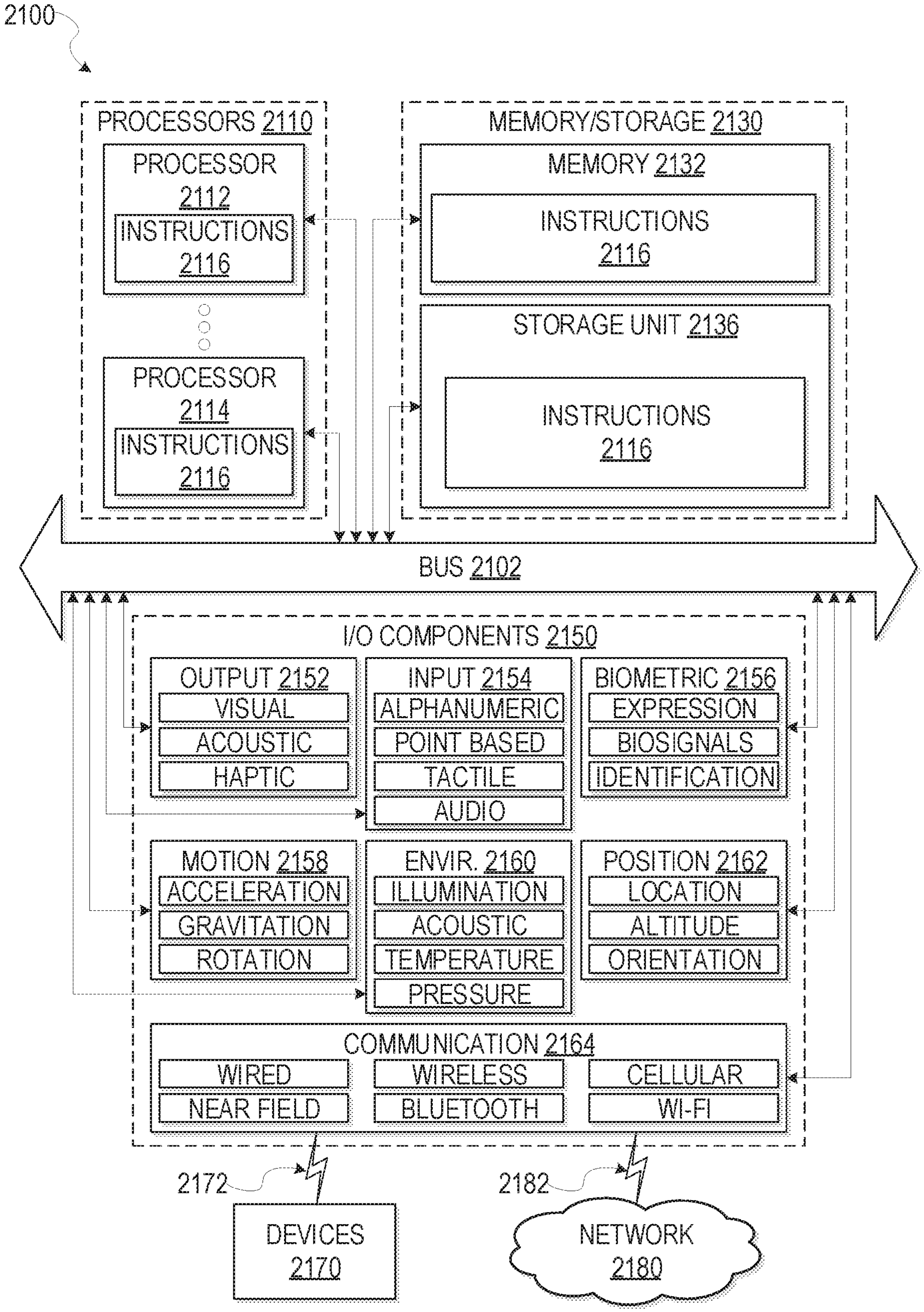
FIG. 9 is a block diagram illustrating components of a machine, according to some example embodiments.

FIG. 9 is a block diagram illustrating components of a machine 2100, according to some example embodiments, able to read instructions from a machine-storage medium and perform any one or more of the methodologies discussed herein. Specifically, FIG. 9 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIGS. 3A-5B. Additionally, or alternatively, the instructions 2116 may implement the modules, engines, applications, and so forth, as described in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 9 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-storage media.

As used herein, "machine-storage medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-storage medium" should be taken to include a single medium or multiple media (e.g., a centralized or distributed database, or associated caches and servers) able to store the instructions 2116. The term "machine-storage medium" shall also be taken to include any medium, or combination of multiple media, that is capable of storing instructions (e.g., instructions 2116) for execution by a machine (e.g., machine 2100), such that the instructions 2116, when executed by one or more processors of the machine (e.g., processors 2110), cause the machine to perform any one or more of the methodologies described herein. Accordingly, a "machine-storage medium" refers to a single storage apparatus or device, as well as "cloud-based" storage systems or storage networks that include multiple storage apparatus or devices. The term "machine-storage medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 8. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170.

The term "signal medium" or "transmission medium" shall be taken to include any intangible medium that is capable of storing, encoding, or carrying the instructions 2116 for execution by the machine 2100, and includes digital or analog communications signals or other intangible media to facilitate communication of such software.

The terms "machine-readable medium," "computer-readable medium" and "device-readable medium" mean the same thing and may be used interchangeably in this disclosure. The terms are defined to include both machine-storage media and transmission medium. Thus, the terms include both storage devices/media and carrier waves/modulated data signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:

presenting, over a network, a first user interface comprising user interface elements indicating a plurality of software vulnerabilities for a virtual machine, wherein the user interface elements comprise a user interface element for presenting one or more recovery point identifiers associated with a software vulnerability of the plurality of software vulnerabilities, wherein the user interface element for presenting one or more recovery point identifiers associated with the software vulnerability also indicates a start date of the software vulnerability at the virtual machine;

receiving, over the network, a selection of the user interface element for presenting one or more recovery point identifiers associated with the software vulnerability;

identifying, in a database and based at least in part on receiving the selection of the software vulnerability, at least two snapshot images for the virtual machine that include the software vulnerability; and presenting, over the network in response to the selection of the user interface element and based at least in part on the identifying and the start date of the software vulnerability, a second user interface including at least two recovery point identifiers corresponding to the at least two snapshot images for the virtual machine that include the software vulnerability.

2. The method of claim 1, further comprising:

receiving, over the network, a request to present the plurality of software vulnerabilities for the virtual machine, wherein the first user interface is presented in response to the request.

3. The method of claim 2, wherein the request includes a virtual machine identifier identifying the virtual machine on a production machine.

4. The method of claim 1, wherein the user interface element comprises a histogram bar, and wherein a leading end of the histogram bar indicates the start date.

5. The method of claim 4, further comprising:

receiving, over the network and after presenting the first user interface, the selection identifying the user interface element.

6. The method of claim 4, wherein a trailing end of the histogram bar indicates an end date of the software vulnerability at the virtual machine.

7. The method of claim 1, wherein the second user interface comprises user interface elements that present the at least two recovery point identifiers.

8. The method of claim 1, wherein identifying the at least two snapshot images comprises:

identifying archive events that associate a virtual machine identifier for the virtual machine with a snapshot image of the at least two snapshot images and a vulnerability identifier for the software vulnerability.

9. The method of claim 1, further comprising:

receiving, over the network, a selection of a recovery point identifier of the at least two recovery point identifiers corresponding to a snapshot image of the at least two snapshot images.

10. The method of claim 9, further comprising:

mounting, in response to the selection of the recovery point identifier, the snapshot image to a backup machine; and performing, after mounting the snapshot image to the backup machine, a forensic analysis of the software vulnerability for the virtual machine.

11. The method of claim 1, wherein the software vulnerability is associated with a patch for remediating the software vulnerability, the method further comprising:

pushing the patch to a production machine that comprises the virtual machine.

12. An apparatus, comprising:

one or more processors; and one or more memories storing instructions that are executable, individually or collectively, by the one or more processors to cause the apparatus to:

present, over a network, a first user interface comprising user interface elements indicating a plurality of software vulnerabilities for a virtual machine, wherein the user interface elements comprise a user interface element for presenting one or more recovery point identifiers associated with a software vulnerability of the plurality of software vulnerabilities, wherein the user interface element for presenting one or more recovery point identifiers associated with the software vulnerability also indicates a start date of the software vulnerability at the virtual machine;

receive, over the network, a selection of the user interface element for presenting one or more recovery point identifiers associated with the software vulnerability;

identify, in a database and based at least in part on receiving the selection of the software vulnerability, at least two snapshot images for the virtual machine that include the software vulnerability; and present, over the network in response to the selection of the user interface element and based at least in part on the identifying and the start date of the software vulnerability, a second user interface including at least two recovery point identifiers corresponding to the at least two snapshot images for the virtual machine that include the software vulnerability.

13. The apparatus of claim 12, wherein the instructions are further executable, individually or collectively, by the one or more processors to cause the apparatus to:

receive, over the network, a request to present the plurality of software vulnerabilities for the virtual machine, wherein the first user interface is presented in response to the request.

14. The apparatus of claim 12, wherein the instructions are further executable, individually or collectively, by the one or more processors to cause the apparatus to:

receive, over the network, a selection of a recovery point identifier of the at least two recovery point identifiers corresponding to a snapshot image of the at least two snapshot images.

15. The apparatus of claim 12, wherein the software vulnerability is associated with a patch for remediating the software vulnerability, and wherein the instructions are further executable, individually or collectively, by the one or more processors to cause the apparatus to:

push the patch to a production machine that comprises the virtual machine.

16. A non-transitory, computer-readable medium that stores code comprising instructions that are executable, individually or collectively, by one or more processors of an electronic device to cause the electronic device to:

present, over a network, a first user interface comprising user interface elements indicating a plurality of software vulnerabilities for a virtual machine, wherein the user interface elements comprise a user interface element for presenting one or more recovery point identifiers associated with a software vulnerability of the plurality of software vulnerabilities, wherein the user interface element for presenting one or more recovery point identifiers associated with the software vulnerability also indicates a start date of the software vulnerability at the virtual machine;

receive, over the network, a selection of the user interface element for presenting one or more recovery point identifiers associated with the software vulnerability;

identify, in a database and based at least in part on receiving the selection of the software vulnerability, at least two snapshot images for the virtual machine that include the software vulnerability; and present, over the network in response to the selection of the user interface element and based at least in part on the identifying and the start date of the software vulnerability, a second user interface including at least two recovery point identifiers corresponding to the at least two snapshot images for the virtual machine that include the software vulnerability.

17. The non-transitory, computer-readable medium of claim 16, wherein the instructions are further executable, individually or collectively, by the one or more processors to cause the electronic device to:

receive, over the network, a request to present the plurality of software vulnerabilities for the virtual machine, wherein the first user interface is presented in response to the request.

* * * * *